(12) United States Patent
Svensson et al.

(10) Patent No.: US 12,107,723 B2
(45) Date of Patent: Oct. 1, 2024

(54) SYSTEMS AND METHODS OF DEPLOYING A PROGRAM TO A DISTRIBUTED NETWORK

(71) Applicant: Telefonaktiebolaget LM Ericsson (publ), Stockholm (SE)

(72) Inventors: Fredrik Svensson, Löberöd (SE); Robert Marklund, Furulund (SE); Per Persson, Södra Sandby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 536 days.

(21) Appl. No.: 17/040,736

(22) PCT Filed: Apr. 25, 2018

(86) PCT No.: PCT/EP2018/060625
§ 371 (c)(1),
(2) Date: Sep. 23, 2020

(87) PCT Pub. No.: WO2019/206411
PCT Pub. Date: Oct. 31, 2019

(65) Prior Publication Data
US 2021/0036915 A1    Feb. 4, 2021

(51) Int. Cl.
*H04L 41/082* (2022.01)
*H04L 67/00* (2022.01)

(52) U.S. Cl.
CPC ............ *H04L 41/082* (2013.01); *H04L 67/34* (2013.01)

(58) Field of Classification Search
CPC .... G06F 1/3228; G06F 9/5027; G06F 9/5094; H04L 41/082; H04L 67/34; Y02D 10/00
(Continued)

(56) References Cited

U.S. PATENT DOCUMENTS

2010/0102926 A1    4/2010  Grieve et al.
2012/0210325 A1*   8/2012  de Lind van Wijngaarden ..........
                                                        H04W 52/0258
                                                               718/103
(Continued)

FOREIGN PATENT DOCUMENTS

CN    103929799 A    7/2014
CN    107273527 A   10/2017
(Continued)

OTHER PUBLICATIONS

Anastasi, Giuseppe, et al., "An Adaptive and Low-latency Power Management Protocol for Wireless Sensor Networks", MobiWAC'06, Torremolinos, Malaga, Spain, Oct. 2, 2006, pp. 62-74.
(Continued)

*Primary Examiner* — Tan Doan
(74) *Attorney, Agent, or Firm* — Murphy, Bilak & Homiller, PLLC

(57) ABSTRACT

Systems and methods of deploying a program to a distributed network are provided. In one exemplary embodiment, a method is performed by a node (101, 200, 300) that is associated with a set of distributed nodes (113-115, 500, 600) in a distributed system (111). Further, functions (133-135) of a program (131) are distributable among the set for execution of the program. The method includes obtaining (401*a*) an execution pattern (117) of the program and a sleep requirement (119-121) of at least one distributed node. The method also includes dynamically deploying (403*a*) the functions of the program to all or a portion of the set for execution of the program by the set based on the execution pattern of the program and the sleep requirement of the at least one distributed node.

20 Claims, 16 Drawing Sheets

(58) Field of Classification Search
USPC .......................................................... 709/202
See application file for complete search history.

(56) References Cited

U.S. PATENT DOCUMENTS

| | | | |
|---|---|---|---|
| 2013/0061073 A1* | 3/2013 | Hamamoto | G06F 1/3209 |
| | | | 713/340 |
| 2013/0080816 A1 | 3/2013 | Johnson et al. | |
| 2014/0189398 A1* | 7/2014 | Gorbatov | G06F 1/206 |
| | | | 713/323 |
| 2015/0007185 A1* | 1/2015 | Dey | G06F 9/5072 |
| | | | 718/102 |
| 2015/0033235 A1 | 1/2015 | Engdal et al. | |
| 2015/0033239 A1* | 1/2015 | Heilper | G06F 11/3409 |
| | | | 718/105 |
| 2016/0085219 A1* | 3/2016 | Paul | G06N 5/04 |
| | | | 700/299 |
| 2016/0242117 A1 | 8/2016 | Lin et al. | |
| 2016/0378450 A1* | 12/2016 | Fu | H04L 67/34 |
| | | | 717/177 |
| 2017/0026491 A1 | 1/2017 | Gustafsson et al. | |
| 2017/0272311 A1* | 9/2017 | Kerpez | H04L 41/142 |

FOREIGN PATENT DOCUMENTS

| | | |
|---|---|---|
| WO | 2015009138 A2 | 1/2015 |
| WO | 2015188016 A2 | 12/2015 |
| WO | 2015200342 A1 | 12/2015 |

OTHER PUBLICATIONS

Persson, Per, et al., "Kappa—Serverless IoT Deployment", Association for Computing Machinery, WoSC'17, Las Vegas, NV, USA, Dec. 11-15, 2017, pp. 1-6.

* cited by examiner

1000a

1000b

SYSTEMS AND METHODS OF DEPLOYING A PROGRAM TO A DISTRIBUTED NETWORK

TECHNICAL FIELD

The present disclosure generally relates to distributed networks, and in particular to deploying a program to a distributed network.

BACKGROUND

Power consumption is a critical factor for battery powered devices in a distributed system. In order to operate for long durations such as years without draining the battery, these devices should be operable to disable all hardware components except for a low power consuming component that is capable of allowing a processor or controller of the device to be in a low power consuming, sleep mode. This type of sleep mode is commonly referred to as deep sleep, allowing the device to operate for a long duration. Further, a real-time clock (RTC) is typically used as a low power consuming timing source, allowing the processor or controller to be in a sleep mode while the RTC functions to wake-up the processor or controller from sleep mode at a predetermined time or after a certain period of being in sleep mode.

The decision of when to enter sleep mode may be based on a timeout of an inactivity timer, with the timeout indicating that no activity has occurred during a certain time period or that no known events have triggered the processor or controller during the certain time period. Further, the sleep period is commonly defined using a static parameter when building the binary program that executes on the device. In preparing the processor or controller to enter sleep mode, the state of the memory associated with the application(s) deployed on the device must be written to a memory that is not affected by sleep mode. After the processor or controller has exited sleep mode, the state of the application(s) is restored, allowing the processor or controller to continue execution of the application(s). However, for programmable devices or other similar devices where an application or a function of an application may be deployed in a distributed system without flashing the device, a static sleep period may not be feasible.

Accordingly, there is a need for improved techniques for dynamically finding devices that may host applications based on the execution frequency of the application and the required sleep period of a device. Further, there is a need for improved techniques to tune and adapt the sleep period of a device where explicit triggers are not used. In addition, other desirable features and characteristics of the present disclosure will become apparent from the subsequent detailed description and embodiments, taken in conjunction with the accompanying figures and the foregoing technical field and background.

The Background section of this document is provided to place embodiments of the present disclosure in technological and operational context, to assist those of skill in the art in understanding their scope and utility. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the disclosure or to delineate the scope of the disclosure. The sole purpose of this summary is to present some concepts disclosed herein in a simplified form as a prelude to the more detailed description that is presented later.

Systems and methods of deploying a program to a distributed network are described herein. According to one aspect, a method is performed by a node that is associated with a set of distributed nodes in a distributed system. Further, a plurality of functions of a program is distributable among the set of distributed nodes for execution of the program. The method comprises obtaining an execution pattern of the program and a sleep requirement of at least one distributed node. Further, the method includes dynamically deploying one or more functions of the program to all or a portion of the set for execution of the program by the set based on the execution pattern of the program and the sleep requirement of the at least one distributed node. In addition, the execution pattern is associated with events that trigger execution of at least one of the one or more functions. Also, each node is operable to have the trigger events programmed for that at least one function during deployment or execution of the program.

According to another aspect, the step of obtaining the execution pattern of the program includes receiving, from at least one distributed node, an indication of the execution pattern of the program.

According to another aspect, the step of obtaining the execution pattern of the program includes determining the execution pattern of the program based on the events that trigger execution of the at least one of the one or more functions or the sleep requirement of the at least one distributed node.

According to another aspect, the step of obtaining the sleep requirement of at least one distributed node includes receiving, from at least one distributed node, an indication of the sleep requirement of that node.

According to another aspect, the method includes determining a sleep pattern of at least one distributed node based on the sleep requirement of that node.

According to another aspect, the method includes determining a sleep pattern of at least one distributed node based on the events that trigger execution of the at least one of the one or more functions.

According to another aspect, the step of dynamically deploying the one or more functions of the program includes matching each function of the program to one distributed node of the set based on the execution pattern of the program and the sleep requirement of that distributed node.

According to another aspect, the step of dynamically deploying the one or more functions of the program includes matching the at least one of the one or more functions that is triggered by the events to one distributed node of the set based on the execution pattern of the program and the sleep requirement of each node.

According to another aspect, the one distributed node of the set that is matched to the at least one of the one or more functions that is triggered by the events is operable to have a sleep pattern of that node programmed based on the pattern of those trigger events.

According to another aspect, the step of obtaining the execution pattern of the program includes obtaining a pattern of the trigger events that trigger execution of the at least one of the one or more functions. Further, the execution pattern of the program is the trigger event pattern.

According to another aspect, the step of obtaining the pattern of the trigger events includes receiving, from the distributed node that hosts the at least one of the one or more function.

According to another aspect, the step of obtaining the pattern of the trigger events includes determining the pattern of those trigger events based on the events that trigger execution of the at least one of the one or more functions.

According to another aspect, the method includes adapting the sleep pattern of at least one distributed node during execution of the program based on the execution pattern of the program.

According to another aspect, the method includes obtaining an execution pattern of a second program. Further, the method includes dynamically deploying one or more functions of the second program to all or a portion of the set for execution of the second program contemporaneous with the execution of the program by the set based on the execution patterns of the program and the second program and the sleep requirement of the at least one distributed node.

According to another aspect, the events that trigger execution of the at least one of the one or more functions is associated with a hardware or software timer of the distributed node of the set that hosts the at least one of the one or more functions that is triggered by the events.

According to another aspect, the events that trigger execution of the at least one of the one or more functions is associated with a sleep requirement of the distributed node of the set that hosts the at least one of the one or more functions that is triggered by the events.

According to another aspect, the events that trigger execution of the at least one of the one or more functions is associated with a sensor of the distributed node of the set that hosts the at least one of the one or more functions that is triggered by the events.

According to another aspect, the node represents at least one distributed node of the set.

According to another aspect, the node is a network node.

According to another aspect, the node is represented by a virtual server.

According to another aspect, at least one distributed node of the set is represented by a network node.

According to another aspect, two or more distributed nodes of the set are each represented by different processors of a same network node.

According to another aspect, at least one distributed node of the set is represented by a virtual server.

According to one aspect, a node is associated with a set of distributed nodes in a distributed system. Further, a plurality of functions of a program are distributed among the set of distributed nodes for execution of the program. The node is configured to obtain an execution pattern of the program and a sleep requirement of at least one distributed node. The node also dynamically deploys one or more functions of the program to all or a portion of the set for execution of the program by the set based on the execution pattern of the program and the sleep requirement of the at least one distributed node. The execution pattern is associated with events that trigger execution of at least one of the one or more functions. In addition, each node is operable to have the trigger events programmed for that at least one function during deployment or execution of the program.

According to one aspect, a node is associated with a set of distributed nodes in a distributed system. Further, a plurality of functions of a program is distributed among the set of distributed nodes for execution of the program. The node comprises an obtaining unit for obtaining an execution pattern of the program and a sleep requirement of at least one distributed node. Further, the node includes a deploying unit for dynamically deploying one or more functions of the program to all or a portion of the set for execution of the program by the set based on the execution pattern of the program and the predetermined sleep requirement of the at least one distributed node. Also, the execution pattern is associated with events that trigger execution of at least one function. In addition, each node is operable to have the trigger events programmed for that at least one function during deployment or execution of the program.

According to one aspect, a computer program comprises instructions which, when executed on at least one processor of a node that is associated with a set of distributed nodes in a distributed system, with a plurality of functions of a program distributed among the set for execution of the program, cause the at least one processor to carry out any of the methods described herein. Further, a carrier may contain the computer program with the carrier being one of an electronic signal, optical signal, radio signal, or computer readable storage medium.

According to one aspect, a method is performed by an instance of an application that is executed on a distributed node of a set of distributed nodes in a distributed system. Each distributed node is operable to contemporaneously execute an instance of the application. The method includes obtaining at least one of one or more functions of a program that is distributed among the set for execution of the program. The method also includes obtaining a run-time configuration of the at least one of the one or more functions. The run-time configuration includes a sleep requirement for the distributed node while the at least one of the one or more functions is activated. Further, the method includes installing the at least one of the one or more functions on the distributed node based on the run-time configuration, including configuring a sleep pattern of a low power mode of the distributed node based on the sleep requirement. Also, the method includes activating the at least one of the one or more functions according to the run-time configuration. While the at least one of the one or more functions is activated, the method includes acquiring information associated with the execution pattern of the at least one of the one or more functions so that the sleep pattern of the distributed node is adapted based on that execution pattern.

According to another aspect, the method includes obtaining an event trigger configuration of the at least one of the one or more functions. The event trigger configuration is associated with a programming model that enables each node to be operable to generate events that trigger execution of the at least one of the one or more functions. Further, the method includes configuring the distributed node to generate the events that trigger execution of the at least one of the one or more functions based on the run-time configuration. Additionally, the method includes activating the event triggers.

According to another aspect, the method includes obtaining a distributed network configuration. The distributed network configuration indicates a network address of those distributed nodes of the set that interface directly to the distributed node. Further, the step of installing the at least one of the one or more functions on the distributed node is based on the run-time configuration and the distributed network configuration.

According to one aspect, a distributed node is of a set of distributed nodes in a distributed system. Each distributed node is operable to contemporaneously execute an instance of an application. The distributed node is configured to execute an instance of the application, which is operable to obtain at least one of one or more functions of a program that is distributed among the set for execution of the program. Further, the distributed node is configured to execute an instance of the application, which is operable to obtain a run-time configuration of the at least one of the one or more functions. The run-time configuration includes a sleep requirement for the distributed node while the at least one of the one or more functions is activated. Also, the distributed node is configured to execute an instance of the application, which is operable to install the at least one of the one or more functions on the distributed node based on the run-time configuration, including configuring a sleep pattern of a low power mode of the distributed node based on the sleep requirement. In addition, the distributed node is configured to execute an instance of the application, which is operable to activate the at least one of the one or more functions according to the run-time configuration. While the at least one of the one or more functions is activated, the distributed node is configured to execute an instance of the application, which is operable to acquire information associated with the execution pattern of the at least one of the one or more functions so that the sleep pattern of the distributed node is adapted based on that execution pattern.

According to another aspect, the distributed node is further configured to include communication circuitry and processing circuitry.

According to another aspect, the distributed node is further configured to include communication circuitry, processing circuitry, and a sensor associated with events that trigger execution of the at least one of the one or more functions.

According to one aspect, a distributed node is of a set of distributed nodes in a distributed system. Each distributed node is operable to contemporaneously execute an instance of the application. The distributed node comprises an executing unit for executing an instance of the application, including a function obtaining unit for obtaining at least one of one or more functions of a program that are distributed among the set for execution of the program. Further, the distributed node includes a run-time configuration obtaining unit for obtaining a run-time configuration of the at least one of the one or more functions. The run-time configuration includes a sleep requirement for the distributed node while the at least one of the one or more functions is activated. The distributed node also includes an installing unit for installing the at least one of the one or more functions on the distributed node based on the run-time configuration, including configuring a sleep pattern of a low power mode of the distributed node based on the sleep requirement. In addition, the distributed node includes an activating unit for activating the at least one of the one or more functions according to the run-time configuration. Finally, the distributed node includes an acquiring unit for acquiring information associated with the execution pattern of the at least one of the one or more functions while the at least one of the one or more functions is activated, so that the sleep pattern of the distributed node is adapted based on that execution pattern.

According to one aspect, a computer program represents an instance of an application. Further, the computer program comprises instructions which, when executed on at least one processor of a distributed node of a set of distributed nodes in a distributed system. Each distributed node is operable to contemporaneously execute an instance of the application to cause the at least one processor to carry out any of the methods described herein. Further, a carrier may contain the computer program with the carrier being one of an electronic signal, optical signal, radio signal, or computer readable storage medium.

BRIEF DESCRIPTION OF THE DRAWINGS

The present disclosure will now be described more fully hereinafter with reference to the accompanying drawings, in which embodiments of the disclosure are shown. However, this disclosure should not be construed as limited to the embodiments set forth herein. Rather, these embodiments are provided so that this disclosure will be thorough and complete, and will fully convey the scope of the disclosure to those skilled in the art. Like numbers refer to like elements throughout.

DETAILED DESCRIPTION

For simplicity and illustrative purposes, the present disclosure is described by referring mainly to an exemplary embodiment thereof. In the following description, numerous specific details are set forth in order to provide a thorough understanding of the present disclosure. However, it will be readily apparent to one of ordinary skill in the art that the present disclosure may be practiced without limitation to these specific details. In this description, well known methods and structures have not been described in detail so as not to unnecessarily obscure the present disclosure.

Figure 1:
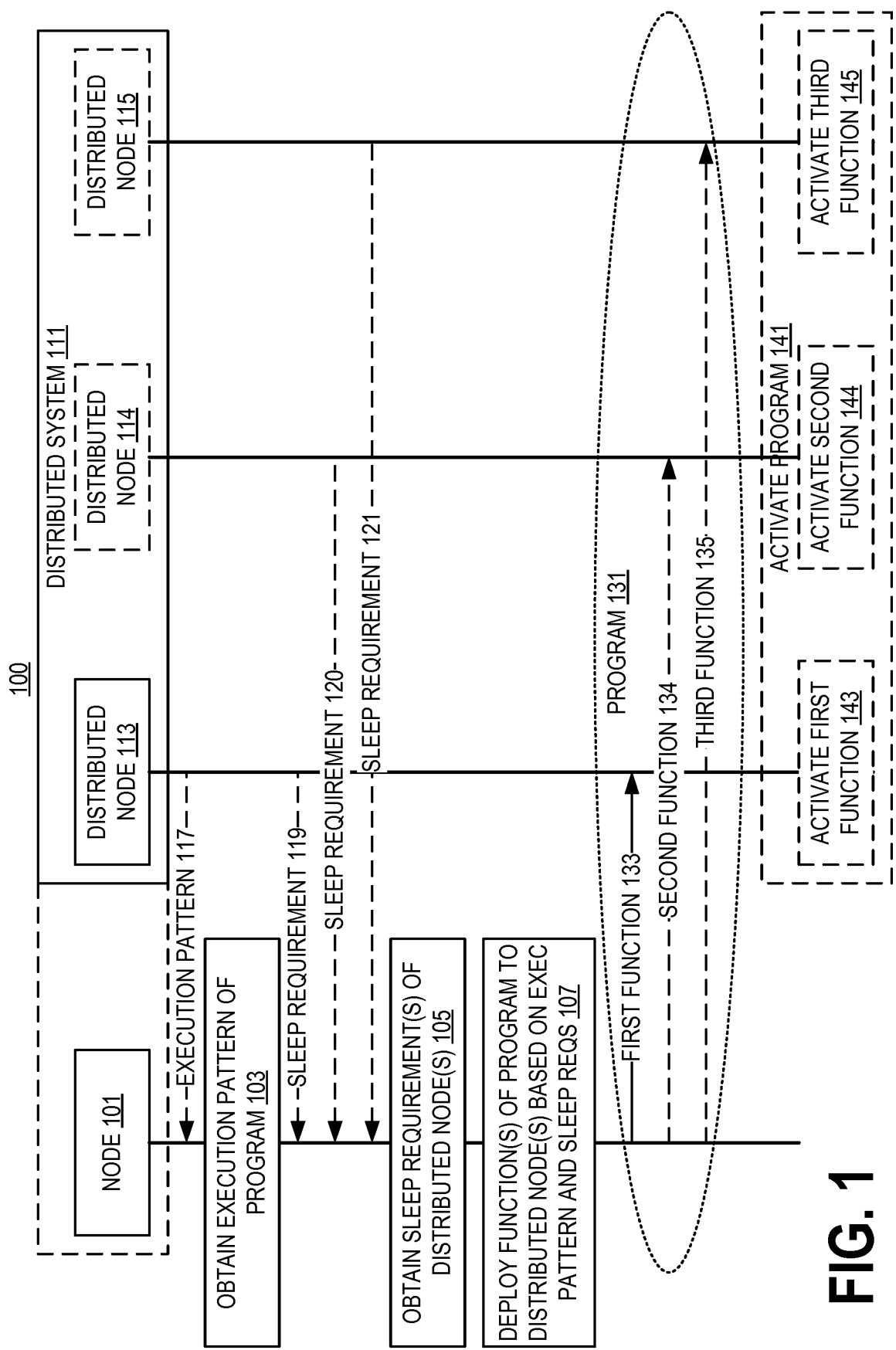
FIG. 1 illustrates one embodiment of a system of deploying a program to a distributed network in accordance with various aspects as described herein.

This disclosure includes describing systems and methods of deploying a program to a distributed network. Further, this disclosure describes novel techniques of deploying an application and functional parts of that application on distributed nodes of a distributed network based on their sleep requirements, resulting in lower energy consumption by the distributed network. For example, FIG. 1 illustrates one embodiment of a system 100 of deploying a program 131 to a distributed network 111 in accordance with various aspects as described herein. In FIG. 1, the system 100 includes a node 101 and the distributed system 111 having a set of distributed nodes 113-115. In one example, the node 101 may be separate from the distributed system 111. In another example, the node 101 may be one of the distributed nodes 113-115 of the distributed system 111. The node 101 is configured to transmit and/or receive information to and/or from each of the distributed nodes 113-115 using any wired or wireless communication technology. Further, each of the distributed nodes 113-115 is configured to transmit and/or receive information to and/or from the node 101 and at least one distributed node 113-115.

In FIG. 1, at block 103, the node 101 obtains an execution pattern 117 of a program having one or more functions such as by receiving, from the distributed node 113, the execution pattern 117 of the program 131. The execution pattern 117 may represent a periodic or aperiodic rate of execution of the program 131. At block 105, the node 101 also obtains sleep requirements 119-121 of the distributed nodes 113-115 such as by receiving, from each distributed node 113-115, its sleep requirement 119-121. Each sleep requirement 119-121 may represent a period of time, after entering a low power mode (e.g., sleep mode, standby mode) from a normal mode, by which a corresponding distributed node 113-115 is required to operate in the low power mode before re-entering the normal mode of operation of that distributed node. For example, the sleep requirement 119-121 may be a predetermined period of time such as in seconds (e.g., 30 sec.), minutes (e.g., 30 min.), hours (e.g., 12 hrs.), days (e.g., 7 days), or the like by which a corresponding distributed node 113-115 is required to be in a low power mode of operation before re-entering a normal mode of operation. Further, this requirement may be associated with a low power mode capability of the corresponding distributed node 113-115; a capacity of a battery (e.g., 3,200 milliamps per hour) of the corresponding distributed node 113-115 that represents a maximum amount of energy that can be extracted from the battery by the corresponding distributed node 113-115 under certain conditions; an amount of current that is required by the corresponding distributed node 113-115 such as during its normal or sleep mode of operation; a length of time (e.g., 1 year) in which the corresponding distributed node 113-115 is required to operate such as from a battery, or the like. Further, each distributed node 113-115 operating in a low power mode consumes less power than that distributed node 113-115 operating in a normal mode. In addition, the node 101 deploys the functions 133-135 of the program 131 to the corresponding distributed node 113-115 for execution of the program 131 by the distributed nodes 113-115 based on the execution pattern 117 of the program 131 and the sleep requirement 119-121 of each distributed node 113-115.

In the current embodiment, each distributed node 113-115 is operable to contemporaneously execute an instance of an application that is associated with the deployment of the functions 133-135 of the program 131. An instance of the application that is executed on each distributed node 113-115 obtains the corresponding function 133-135 and a run-time configuration associated with that function. The run-time configuration may include a sleep requirement for the corresponding distributed node 113-115. Each instance of the application installs the corresponding function 133-135 on the associated distributed node 113-115, including configuring a sleep pattern of a low power mode of that distributed node 113-115 based on its sleep requirement 119-121. The sleep pattern may represent a determined pattern of when and for how long a corresponding distributed node 113-115 operates in a low power mode (e.g., sleep mode, standby mode) based on its sleep requirement 119-121 and the execution pattern 117 of the function(s) 133-135 deployed on that node 113-115. In one example, the execution pattern 117 of the program 131 indicates that the program needs to be executed every minute from 9:00 a.m. to 5:00 p.m. each day and every hour outside those times. Further, the sleep requirement 119-121 indicates that the corresponding distributed node 113-115 may be in a sleep mode of operation for at most thirty minutes. Accordingly, the sleep pattern is determined to be one minute from 9:00 a.m. to 5:00 p.m. each day and thirty minutes outside those times. In another example, the execution pattern 117 of the program 131 indicates that the program needs to be executed once at the end of every calendar month such as to report a measurement reading. However, the sleep requirement 119-121 indicates that the corresponding distributed node 113-115 may be in a sleep mode of operation for a maximum of one week. Accordingly, the sleep pattern includes the corresponding distributed node 113-115 being in a one week low power mode for three or four consecutive weeks followed by one or more days of a low power mode dependent on the number of days in the month. In yet another example, the execution pattern 117 of the program 131 indicates that the program needs to be executed at specific times during the day, week, or month. Further, the sleep requirement 119-121 indicates that the corresponding distributed node 113-115 may be in a sleep mode of operation for a maximum of one year. As such, the sleep pattern is represented by the execution pattern 117 of the program 131.

Next, the program 131 is activated 141 on the set of distributed nodes 113-115 by each instance of the application activating the corresponding function 133-135 on the associated distributed node 113-115, as represented by respective blocks 143-145. While the program 131 is activated on the set of distributed nodes 113-115, at least one of the distributed nodes 113-115 acquires information associated with the execution pattern 117 of the corresponding function 133-135 so that the sleep pattern of that distributed node is adapted based on that execution pattern 117.

Furthermore, the node 101 may be a computer-implemented node that is a communication redistribution point or a communication endpoint in a network such as a computer server, a base station, a core network node, a handheld computer, a desktop computer, a laptop computer, a tablet computer, a set-top box, a television, an appliance, a medical device, or some other like terminology. Further, the node 101 may be user equipment (UE), a mobile station (MS), a terminal, a cellular phone, a cellular handset, a personal digital assistant (PDA), a smartphone, a wireless phone, an organizer, a handheld computer, a desktop computer, a laptop computer, a tablet computer, a set-top box, a television, an appliance, a game device, a medical device, a display device, a metering device, or the like. Also, the node 101 may be one or more of the distributed nodes 113-115. In addition, the node 101 may represent a virtual server.

Moreover, at least one distribution node 113-115 may be a computer-implemented node that is a communication redistribution point or a communication endpoint in a network such as a computer server, a base station, a core network node, a handheld computer, a desktop computer, a laptop computer, a tablet computer, a set-top box, a television, an appliance, a medical device, or some other like terminology. Further, at least one distribution node 113-115 may be user equipment (UE), a mobile station (MS), a terminal, a cellular phone, a cellular handset, a personal digital assistant (PDA), a smartphone, a wireless phone, an organizer, a handheld computer, a desktop computer, a laptop computer, a tablet computer, a set-top box, a television, an appliance, a game device, a medical device, a display device, a metering device, or the like. Also, at least two distribution nodes 113-115 may be each represented by different processors of a same node. In addition, at least one distribution node 113-115 may represent a virtual server.

Figure 2:
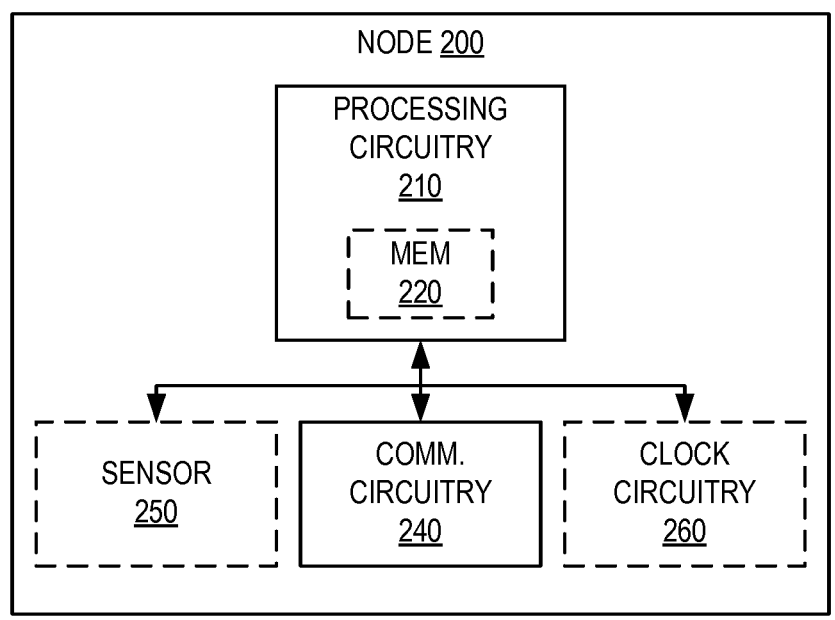
FIG. 2 illustrates one embodiment of a node associated with a distributed system in accordance with various aspects as described herein.

FIG. 2 illustrates one embodiment of a node 200 associated with a distributed system in accordance with various aspects as described herein. As shown, the node 200 includes processing circuitry 210 and communication circuitry 230. The communication circuitry 230 is configured to transmit and/or receive information to and/or from one or more other nodes (e.g., via any communication technology). The processing circuitry 210 is configured to perform processing described above, such as by executing instructions stored in memory 220. The processing circuitry 210 in this regard may implement certain functional means, units, or modules. The node 200 may also include a sensor 250 and clock circuitry 260. The sensor 250 may be configured to detect events such as changes in the node's environment to trigger execution of at least one function of a program by the processing circuitry 210. The clock circuitry 260 may be configured to allow the processing circuitry 210 to be placed into a low power mode (e.g., sleep mode) so that the processing circuitry 210 consumes less power than it consumes during a normal or typical operating mode. During the transition to a low power mode, the state of the processing circuitry 210 may be stored or paused so that the state of the processing circuitry 210 may be restored or re-started during the transition to a normal operating of the processing circuitry, enabling the processing circuitry 210 to continue operation from the same state that it entered sleep mode. Further, the time period in which the processing circuitry 210 is in a low power mode may be programmable via the processing circuitry 210 based on a sleep requirement of the distributed node 200.

Figure 3:
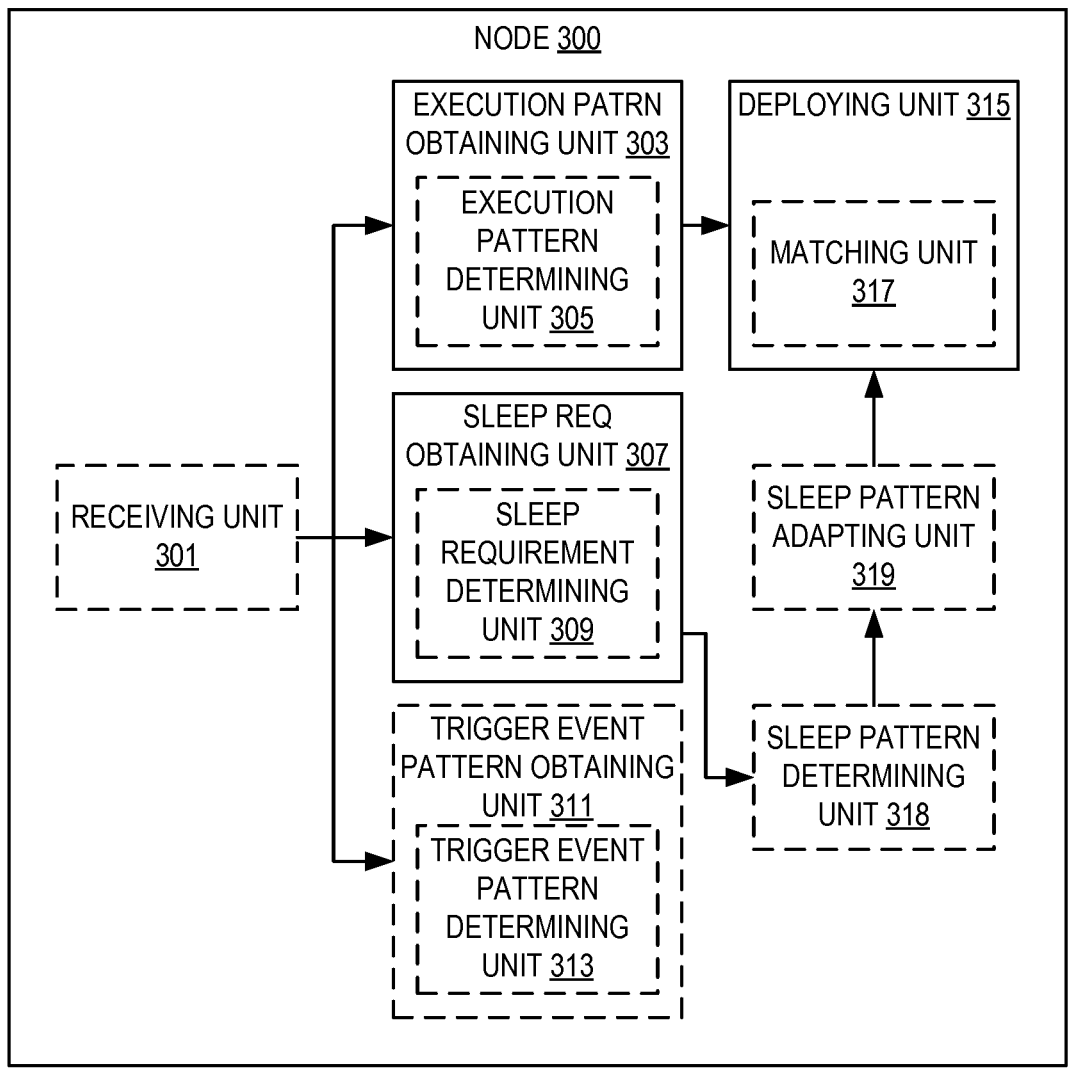
FIG. 3 illustrates another embodiment of a node associated with a distributed system in accordance with various aspects as described herein.

FIG. 3 illustrates another embodiment of a node 300 associated with a distributed system in accordance with various aspects as described herein. As shown, the node 300 implements various functional means, units, or modules (e.g., via the processing circuitry 210 in FIG. 2, via software code), or circuits. In one embodiment, these functional means, units, modules, or circuits (e.g., for implementing the method(s) herein) may include for instance: a receiving unit 301 for receiving, among other things, an execution pattern of a program, a sleep requirement of a distributed node, or a pattern of trigger events that trigger execution of a function of a program; an execution pattern obtaining unit 303 for obtaining the execution pattern of the program; a sleep requirement obtaining unit 307 for obtaining the sleep requirement of the distributed node; a trigger event pattern obtaining unit 311 for obtaining the pattern of trigger events that trigger execution of the function of the program; a deploying unit 315 for dynamically deploying one or more functions of the program to all or a portion of a set of distributed nodes for execution of the program by the set based on the execution pattern of the program and the sleep requirement of the distributed node; a sleep pattern determining unit 318 for determining a sleep pattern of the at least one distributed node based on the sleep requirement of that node; and a sleep pattern adapting unit 319 for adapting the sleep pattern of at least one distributed node during execution of the first program based on the execution pattern of the first program.

In another embodiment, the execution pattern obtaining unit 303 may include an execution pattern determining unit 305 for determining the execution pattern of the program based on events that trigger execution of the at least one function or the sleep requirement of the distributed node.

In another embodiment, the sleep requirement obtaining unit 307 may include a sleep requirement determining unit 309 for determining the sleep pattern of the distributed node based on the events that trigger execution of the function.

In another embodiment, the trigger event pattern obtaining unit 311 may include a trigger event pattern determining unit 313 for determining the trigger event pattern based on the events that trigger execution of the function.

In another embodiment, the deploying unit 313 may include matching each function of the program to one distributed node of the set of distributed nodes based on the execution pattern of the program and the sleep requirement of that distributed node.

In another embodiment, the execution pattern obtaining unit 311 may include obtaining an execution pattern of a second program. Further, the deploying unit 313 may include dynamically deploying one or more functions of the second program to all or a portion of the set of distributed nodes for execution of the second program contemporaneous with the execution of the first program by the set based on the execution patterns of the first and second programs and the sleep requirement of the distributed node.

Figure 4A:
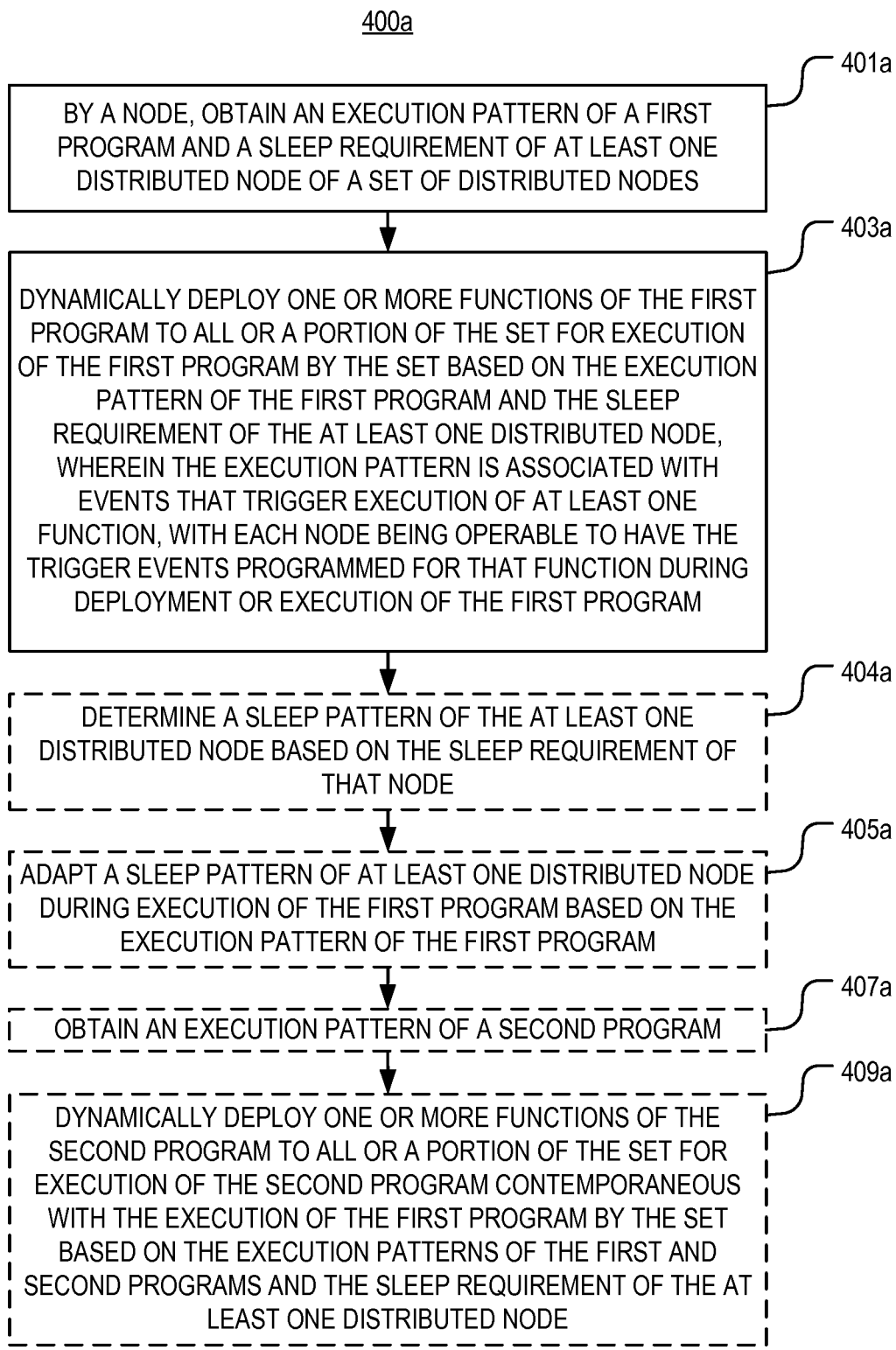
FIGS. 4A-E illustrate embodiments of a method performed by a node of deploying a program to a distributed network in accordance with various aspects as described herein.

FIGS. 4A-E illustrate embodiments of a method 400a performed by a node of deploying a program to a distributed network in accordance with various aspects as described herein. In FIG. 4A, the method 400a may start, for instance, at block 401a, where it includes obtaining an execution pattern of a first program and a sleep requirement of at least one distributed node of a set of distributed nodes. Further, the method 400a includes dynamically deploying one or more functions of the first program to all or a portion of the set of distributed nodes for execution of the first program by the set based on the execution pattern of the first program and the sleep requirement of the at least one distributed node, as represented by block 403a. The execution pattern is associated with events that trigger execution of at least one function. Also, each node is operable to have the trigger events programmed for that function during deployment or execution of the first program. At block 404a, the method 400a may include determining a sleep pattern of the at least one distributed node based on the sleep requirement of that node. At block 405a, the method 400a may include adapting the sleep pattern of at least one distributed node of the set of distributed nodes during execution of the first program based on the execution pattern of the first program. In addition, the method 400a may include obtaining an execution pattern of a second program, as referenced by block 407a. At block 409a, the method 400a may include dynamically deploying one or more functions of the second program to all or a portion of the set of distributed nodes for execution of the second program contemporaneous with the execution of the first program by the set of distributed nodes based on the execution patterns of the first and second programs and the sleep requirement of the at least one distributed node.

Figure 4B:
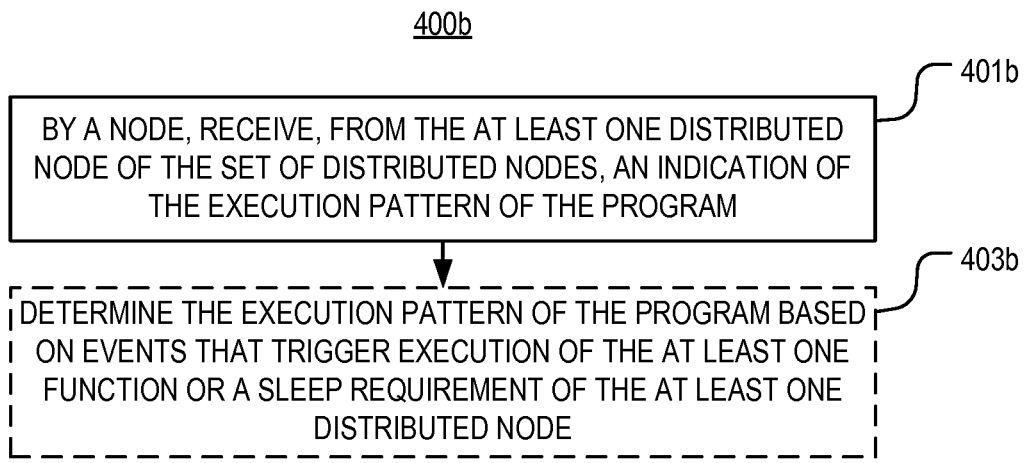

In FIG. 4B, the method 400b may start, for instance, at block 401b, where it includes receiving, from the at least one distributed node of the set of distributed nodes, an indication of the execution pattern of the program. Further, the method 400b may include determining the execution pattern of the program based on events that trigger execution of at least one function or a sleep requirement of the at least one distributed node, as referenced by block 403b.

Figure 4C:
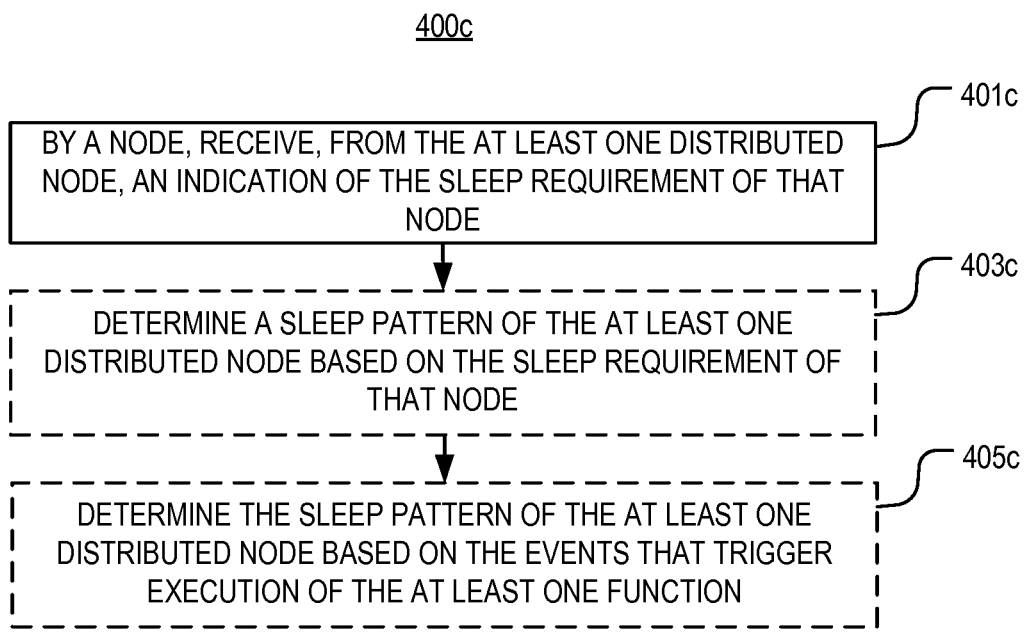

In FIG. 4C, the method 400c may start, for instance, at block 401c, where it includes receiving, from the at least one distributed node, an indication of the sleep requirement of that node. Further, the method 400c may include determining a sleep pattern of the at least one distributed node based on the sleep requirement of that node, as referenced by block 403c. Also, the method 400c may include determining the sleep pattern of the at least one distributed node based on the events that trigger execution of at least one function, as referenced by block 405c.

Figure 4D:
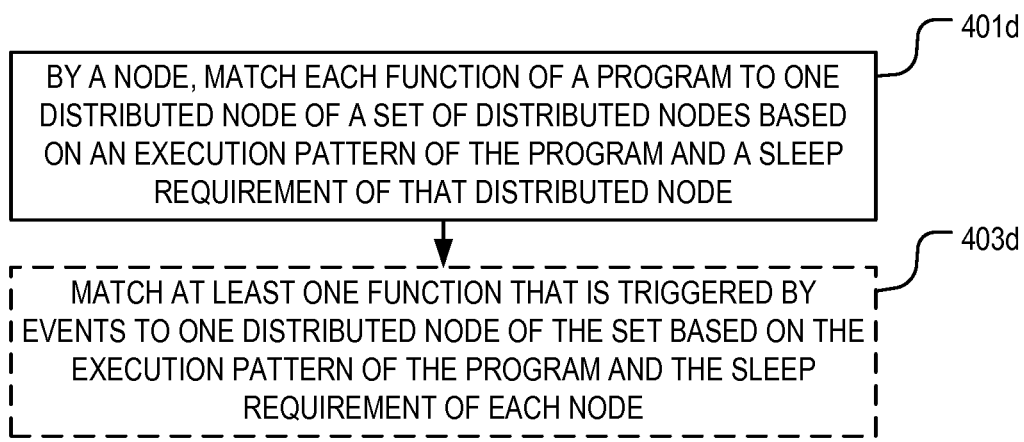

In FIG. 4D, the method 400d may start, for instance, at block 401d, where it includes matching each function of a program to one distributed node of a set of distributed nodes based on an execution pattern of the program and a sleep requirement of that distributed node. Further, the method 400d may include matching at least one function that is triggered by events to one distributed node of the set based on the execution pattern of the program and the sleep requirement of each node, as referenced by block 403d.

Figure 4E:
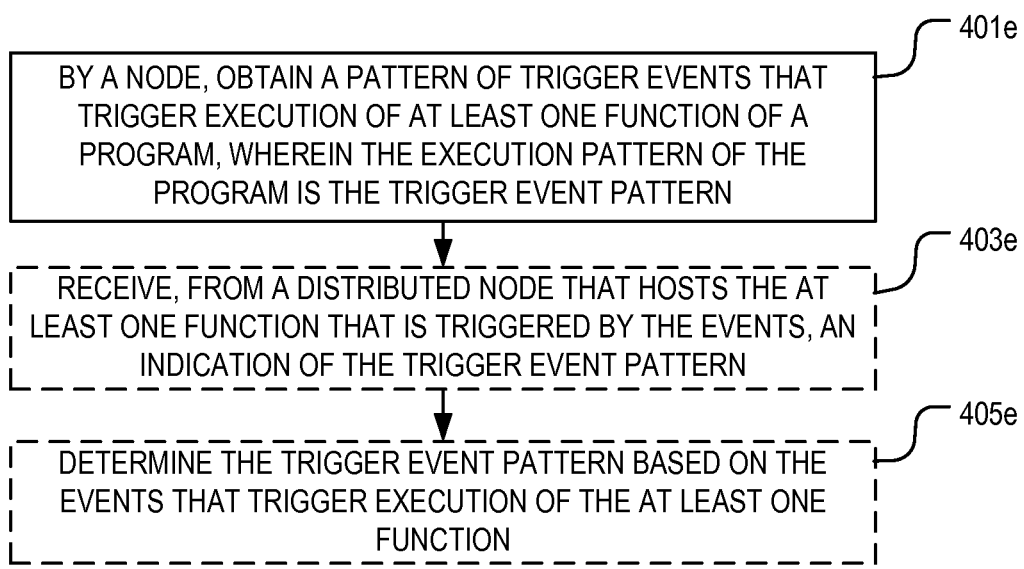

In FIG. 4E, the method 400e may start, for instance, at block 401e, where it includes obtaining a pattern of trigger events that trigger execution of at least one function of the program. Further, the execution pattern of the program is the trigger event pattern. At block 403e, the method 400e may include receiving, from a distributed node that hosts the at least one function that is triggered by the events, an indication of the trigger event pattern. In addition, the method 400e may include determining the trigger event pattern based on the events that trigger execution of the at least one function, as represented by block 405e.

Figure 5:
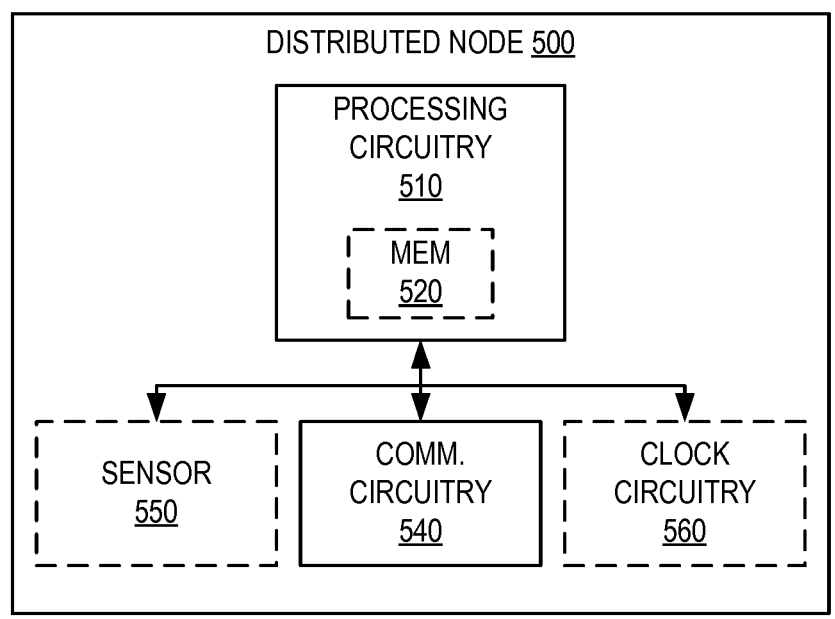
FIG. 5 illustrates one embodiment of a distributed node in accordance with various aspects as described herein.

FIG. 5 illustrates one embodiment of a distributed node 500 in accordance with various aspects as described herein. As shown, the distributed node 500 includes processing circuitry 510 and communication circuitry 530. The communication circuitry 530 is configured to transmit and/or receive information to and/or from one or more other nodes, e.g., via any communication technology. The processing circuitry 510 is configured to perform processing described above, such as by executing instructions stored in memory 520. The processing circuitry 510 in this regard may implement certain functional means, units, or modules. The node 500 may also include a sensor 550 and clock circuitry 560. The sensor 550 may be configured to detect events such as changes in the node's environment to trigger execution of at least one function of a program by the processing circuitry 510. The clock circuitry 560 may be configured to allow the processing circuitry 510 to be placed into a low power mode (e.g., sleep mode) so that the processing circuitry 510 consumes less power than it consumes during a normal or typical operating mode. During the transition to a low power mode, the state of the processing circuitry 510 may be stored or paused so that the state of the processing circuitry 510 may be restored or re-started during the transition to a normal operating of the processing circuitry, enabling the processing circuitry 510 to continue operation from the same state that it entered sleep mode. Further, the time period in which the processing circuitry 510 is in a low power mode may be programmable via the processing circuitry 510 based on a sleep requirement of the distributed node 500.

Figure 6:
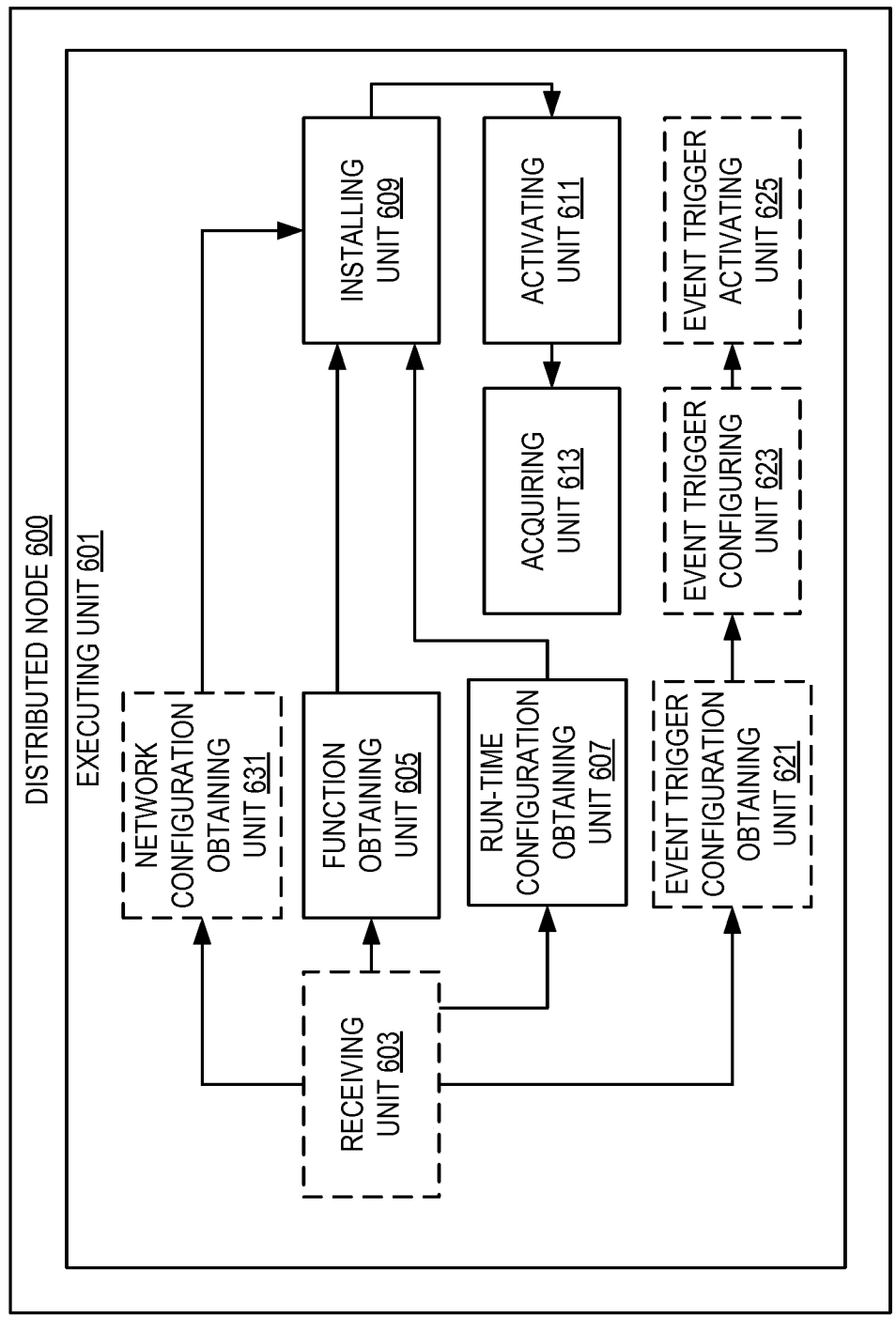
FIG. 6 illustrates another embodiment of a distributed node in accordance with various aspects as described herein.

FIG. 6 illustrates another embodiment of a distributed node 600 in accordance with various aspects as described herein. As shown, the distributed node 600 implements various functional means, units, or modules (e.g., via the processing circuitry 510 in FIG. 5 and/or via software code), or circuits. In one embodiment, these functional means, units, modules, or circuits (e.g., for implementing the method(s) herein) may include for instance: a function obtaining unit 605 for obtaining a function of a program; a run-time configuration obtaining unit 607 for obtaining a run-time configuration of the function, with the run-time configuration including a sleep requirement for the distributed node 600; an installing unit 609 for installing the function on the distributed node 600 based on the run-time configuration; an activating unit 611 for activating the function according to the run-time configuration; and an acquiring unit 613 for acquiring information associated with an execution pattern of the function so that the sleep pattern of the distributed node is adapted based on that execution pattern.

In another embodiment, these functional means, units, modules, or circuits may include for instance: an event trigger configuration obtaining unit 621 for obtaining an event trigger configuration of the function; the event trigger configuring unit 623 for configuring the distributed node 600 to generate the events that trigger execution of the function based on the run-time configuration; and the event trigger activating unit 625 for activating the event triggers.

In another embodiment, these functional means, units, modules, or circuits may include for instance a distributed network configuration obtaining unit 631 for obtaining a distributed network configuration. Further, the installing unit 609 is further configured to install the function on the distributed node based on the run-time configuration and the distributed network configuration.

In another embodiment, these functional means, units, modules, or circuits may include for instance a receiving unit 603 for receiving the function of the program, the distributed network configuration, the run-time configuration, or the event trigger configuration.

Figure 7A:
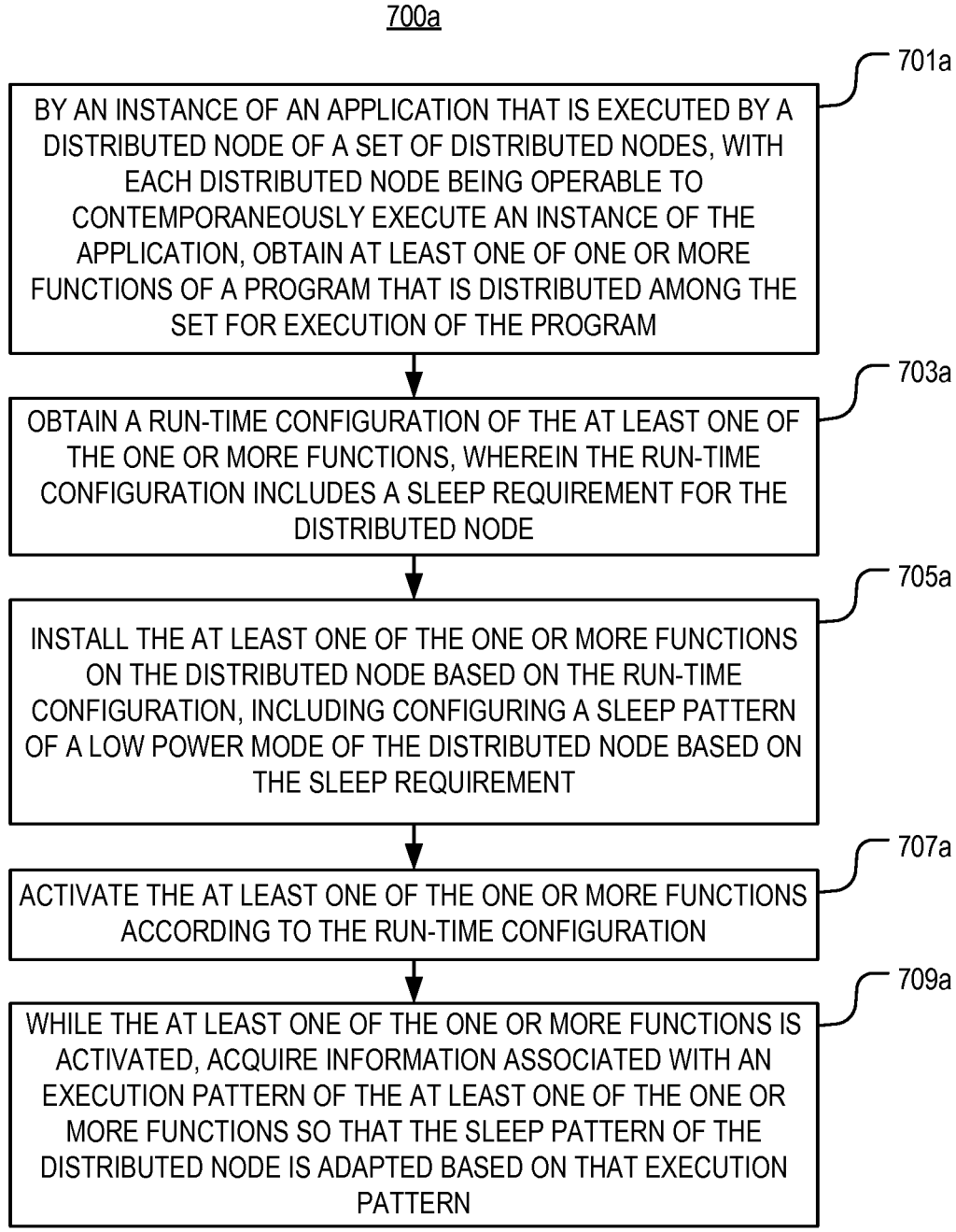
FIGS. 7A-C illustrate embodiments of a method performed by a distributed node of deploying a program to a distributed network in accordance with various aspects as described herein.
Figure 7B:
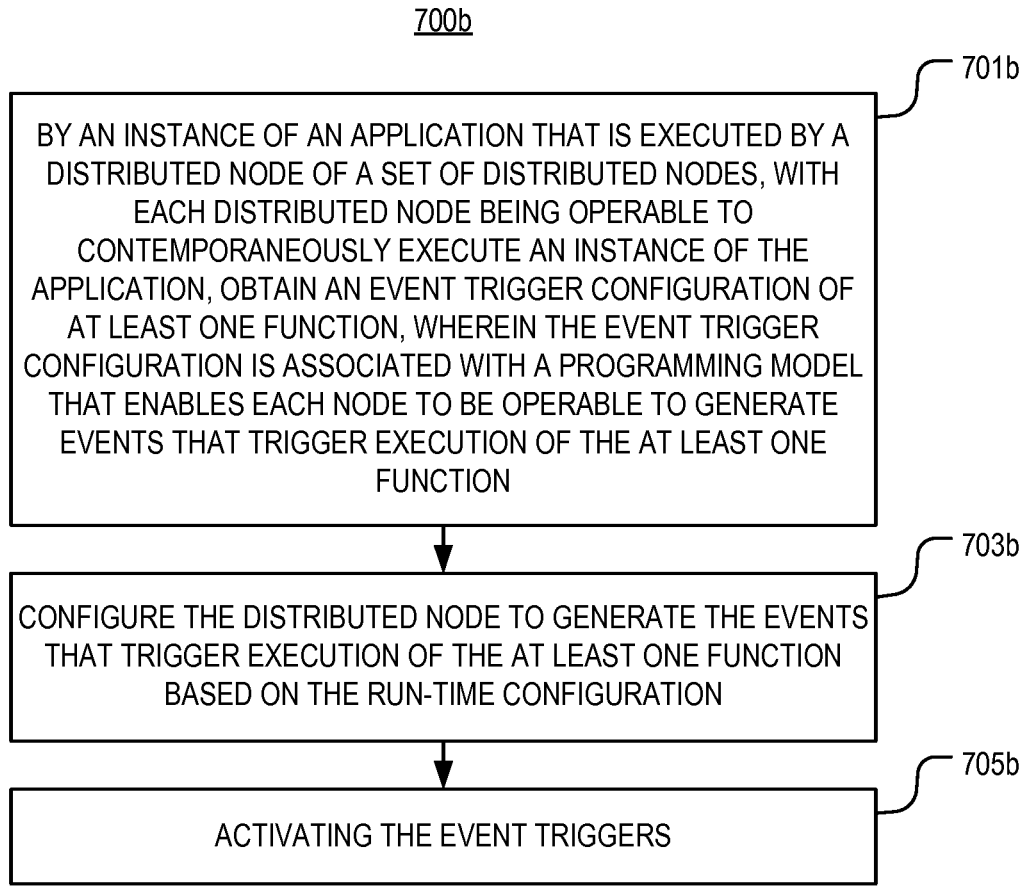
Figure 7C:
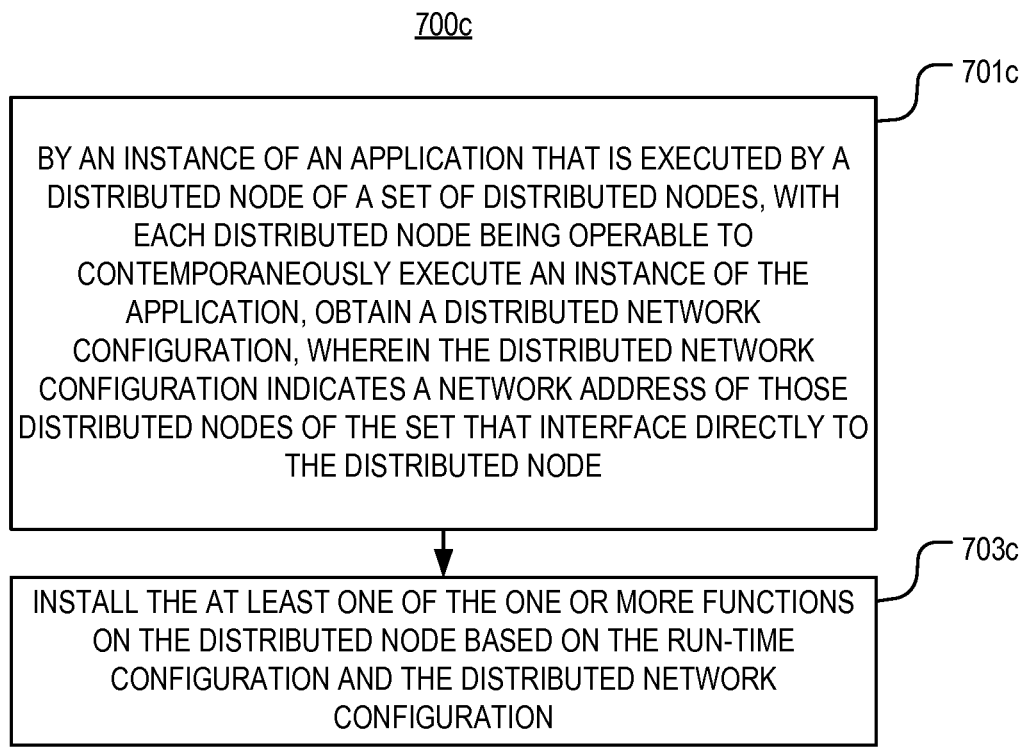

FIGS. 7A-C illustrate embodiments of a method 700a-c performed by an instance of an application that is executed by a distributed node of a set of distributed nodes, with each distributed node being operable to contemporaneously execute an instance of the application, in accordance with various aspects as described herein. In FIG. 7A, the method 700a may start, for instance, at block 701a where it includes obtaining at least one of one or more functions of a program that is distributed among the set for execution of the program. Further, the method 700a includes obtaining a run-time configuration of the at least one of the one or more functions, as represented by block 703a. The run-time configuration includes a sleep requirement for the distributed node. Also, the method 700a includes installing the at least one of the one or more functions on the distributed node based on the run-time configuration, including configuring a sleep pattern of a low power mode of the distributed node based on the sleep requirement, as represented by block 705a. In addition, the method 700a includes activating the at least one of the one or more functions according to the run-time configuration, as represented by block 707a. While the at least one of the one or more functions is activated, the method 700a includes acquiring information associated with an execution pattern of the at least one of the one or more functions so that the sleep pattern of the distributed node is adapted based on that execution pattern, as represented by block 709a.

In FIG. 7B, the method 700b may start, for instance, at block 701b where it includes obtaining an event trigger configuration of at least one function. The event trigger configuration is associated with a programming model that enables each node to be operable to generate events that trigger execution of the at least one function. Further, the method 700b includes configuring the distributed node to generate the events that trigger execution of the at least one function based on the run-time configurations, as represented by block 703*b*. Also, the method 700*b* includes activating the event triggers, as represented by block 705*b*.

In FIG. 7C, the method 700*c* may start, for instance, at block 701*c* where it includes obtaining a distributed network configuration. The distributed network configuration indicates a network address of those distributed nodes of the set that interface directly to the distributed node. Further, the method 700*c* includes installing the at least one of the one or more functions on the distributed node based on the run-time configuration and the distributed network configuration, as represented by block 703*c*.

Note that the apparatuses described above may perform the methods herein and any other processing by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 8:
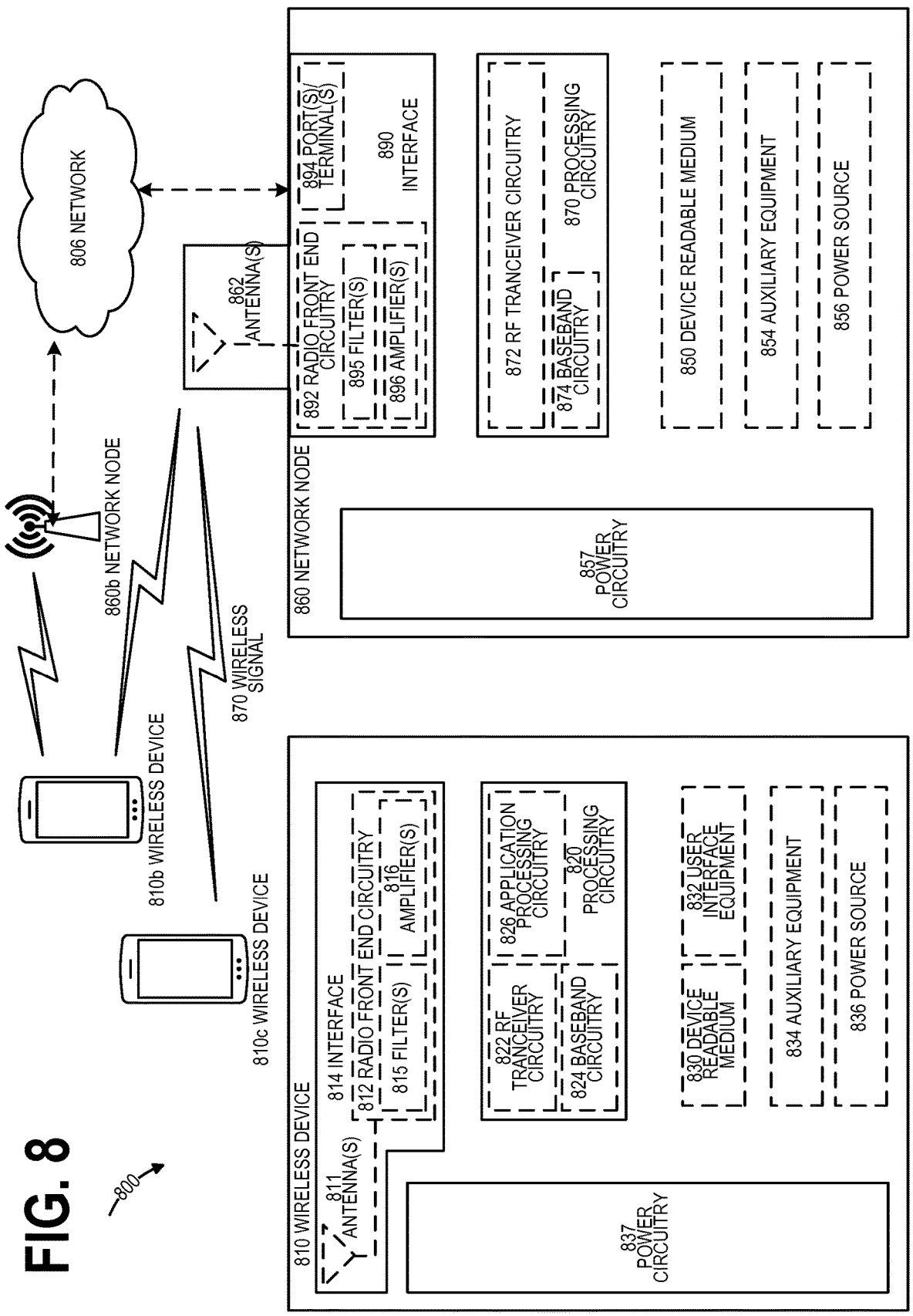
FIG. 8 illustrates one embodiment of a wireless communication network in accordance with various aspects as described herein.

Although the subject matter described herein may be implemented in any appropriate type of system using any suitable components, the embodiments disclosed herein may also be described in relation to a wireless network, such as the example wireless network illustrated in FIG. 8. For simplicity, the wireless network of FIG. 8 only depicts network 806, network nodes 860 and 860*b*, and wireless devices 810, 810*b*, and 810*c*. In practice, a wireless network may further include any additional elements suitable to support communication between wireless devices or between a wireless device and another communication device, such as a landline telephone, a service provider, or any other network node or end device. Of the illustrated components, network node 860 and wireless device 810 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), Narrowband Internet of Things (NB-IoT), and/or other suitable 2G, 3G, 4G, or 8G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 806 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 860 and wireless device 810 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs), and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 8, network node 860 includes processing circuitry 870, device readable medium 880, interface 890, auxiliary equipment 854, power source 856, power circuitry 857, and antenna 862. Although network node 860 illustrated in the example wireless network of FIG. 8 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 860 are depicted as single boxes located within a larger box, or nested within multiple boxes, in practice, a network node may comprise multiple different physical components that make up a single illustrated component (e.g., device readable medium 880 may comprise multiple separate hard drives as well as multiple RAM modules).

Similarly, network node 860 may be composed of multiple physically separate components (e.g., a NodeB component and a RNC component, or a BTS component and a BSC component, etc.), which may each have their own respective components. In certain scenarios in which network node 860 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 860 may be configured to support multiple radio access technologies (RATs). In such embodiments, some components may be duplicated (e.g., separate device readable medium 880 for the different RATs) and some components may be reused (e.g., the same antenna 862 may be shared by the RATs). Network node 860 may also include multiple sets of the various illustrated components for different wireless technologies integrated into network node 860, such as, for example, GSM, WCDMA, LTE, NR, Wi-Fi, or Bluetooth wireless technologies. These wireless technologies may be integrated into the same or different chip or set of chips and other components within network node 860.

Processing circuitry 870 is configured to perform any determining, calculating, or similar operations (e.g., certain obtaining operations) described herein as being provided by a network node. These operations performed by processing circuitry 870 may include processing information obtained by processing circuitry 870 by, for example, converting the obtained information into other information, comparing the obtained information or converted information to information stored in the network node, and/or performing one or more operations based on the obtained information or converted information, and as a result of said processing making a determination.

Processing circuitry 870 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 860 components, such as device readable medium 880, network node 860 functionality. For example, processing circuitry 870 may execute instructions stored in device readable medium 880 or in memory within processing circuitry 870. Such functionality may include providing any of the various wireless features, functions, or benefits discussed herein. In some embodiments, processing circuitry 870 may include a system on a chip (SOC).

In some embodiments, processing circuitry 870 may include one or more of radio frequency (RF) transceiver circuitry 872 and baseband processing circuitry 874. In some embodiments, radio frequency (RF) transceiver circuitry 872 and baseband processing circuitry 874 may be on separate chips (or sets of chips), boards, or units, such as radio units and digital units. In alternative embodiments, part or all of RF transceiver circuitry 872 and baseband processing circuitry 874 may be on the same chip or set of chips, boards, or units In certain embodiments, some or all of the functionality described herein as being provided by a network node, base station, eNB or other such network device may be performed by processing circuitry 870 executing instructions stored on device readable medium 880 or memory within processing circuitry 870. In alternative embodiments, some or all of the functionality may be provided by processing circuitry 870 without executing instructions stored on a separate or discrete device readable medium, such as in a hard-wired manner. In any of those embodiments, whether executing instructions stored on a device readable storage medium or not, processing circuitry 870 may be configured to perform the described functionality. The benefits provided by such functionality are not limited to processing circuitry 870 alone or to other components of network node 860, but are enjoyed by network node 860 as a whole, and/or by end users and the wireless network generally.

Device readable medium 880 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 870. Device readable medium 880 may store any suitable instructions, data or information, including a computer program, software, an application including one or more of logic, rules, code, tables, etc. and/or other instructions capable of being executed by processing circuitry 870 and, utilized by network node 860. Device readable medium 880 may be used to store any calculations made by processing circuitry 870 and/or any data received via interface 890. In some embodiments, processing circuitry 870 and device readable medium 880 may be considered to be integrated.

Interface 890 is used in the wired or wireless communication of signaling and/or data between network node 860, network 806, and/or wireless devices 88. As illustrated, interface 890 comprises port(s)/terminal(s) 894 to send and receive data, for example to and from network 806 over a wired connection. Interface 890 also includes radio front end circuitry 892 that may be coupled to, or in certain embodiments a part of, antenna 862. Radio front end circuitry 892 comprises filters 898 and amplifiers 896. Radio front end circuitry 892 may be connected to antenna 862 and processing circuitry 870. Radio front end circuitry may be configured to condition signals communicated between antenna 862 and processing circuitry 870. Radio front end circuitry 892 may receive digital data that is to be sent out to other network nodes or wireless devices via a wireless connection. Radio front end circuitry 892 may convert the digital data into a radio signal having the appropriate channel and bandwidth parameters using a combination of filters 898 and/or amplifiers 896. The radio signal may then be transmitted via antenna 862. Similarly, when receiving data, antenna 862 may collect radio signals which are then converted into digital data by radio front end circuitry 892. The digital data may be passed to processing circuitry 870. In other embodiments, the interface may comprise different components and/or different combinations of components.

In certain alternative embodiments, network node 860 may not include separate radio front end circuitry 892, instead, processing circuitry 870 may comprise radio front end circuitry and may be connected to antenna 862 without separate radio front end circuitry 892. Similarly, in some embodiments, all or some of RF transceiver circuitry 872 may be considered a part of interface 890. In still other embodiments, interface 890 may include one or more ports or terminals 894, radio front end circuitry 892, and RF transceiver circuitry 872, as part of a radio unit (not shown), and interface 890 may communicate with baseband processing circuitry 874, which is part of a digital unit (not shown).

Antenna 862 may include one or more antennas, or antenna arrays, configured to send and/or receive wireless signals. Antenna 862 may be coupled to radio front end circuitry 890 and may be any type of antenna capable of transmitting and receiving data and/or signals wirelessly. In some embodiments, antenna 862 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 862 may be separate from network node 860 and may be connectable to network node 860 through an interface or port.

Antenna 862, interface 890, and/or processing circuitry 870 may be configured to perform any receiving operations and/or certain obtaining operations described herein as being performed by a network node. Any information, data and/or signals may be received from a wireless device, another network node and/or any other network equipment. Similarly, antenna 862, interface 890, and/or processing circuitry 870 may be configured to perform any transmitting operations described herein as being performed by a network node. Any information, data and/or signals may be transmitted to a wireless device, another network node and/or any other network equipment.

Power circuitry 887 may comprise, or be coupled to, power management circuitry and is configured to supply the components of network node 860 with power for performing the functionality described herein. Power circuitry 887 may receive power from power source 886. Power source 886 and/or power circuitry 887 may be configured to provide power to the various components of network node 860 in a form suitable for the respective components (e.g., at a voltage and current level needed for each respective component). Power source 886 may either be included in, or external to, power circuitry 887 and/or network node 860. For example, network node 860 may be connectable to an external power source (e.g., an electricity outlet) via an input circuitry or interface such as an electrical cable, whereby the external power source supplies power to power circuitry 887. As a further example, power source 886 may comprise a source of power in the form of a battery or battery pack which is connected to, or integrated in, power circuitry 887. The battery may provide backup power should the external power source fail. Other types of power sources, such as photovoltaic devices, may also be used.

Alternative embodiments of network node 860 may include additional components beyond those shown in FIG. 8 that may be responsible for providing certain aspects of the network node's functionality, including any of the functionality described herein and/or any functionality necessary to support the subject matter described herein. For example, network node 860 may include user interface equipment to allow input of information into network node 860 and to allow output of information from network node 860. This may allow a user to perform diagnostic, maintenance, repair, and other administrative functions for network node 860.

As used herein, wireless device refers to a device capable, configured, arranged and/or operable to communicate wirelessly with network nodes and/or other wireless devices. Unless otherwise noted, the term wireless device may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a wireless device may be configured to transmit and/or receive information without direct human interaction. For instance, a wireless device may be designed to transmit information to a network on a predetermined schedule, when triggered by an internal or external event, or in response to requests from the network. Examples of a wireless device include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A wireless device may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a wireless device may represent a machine or other device that performs monitoring and/or measurements, and transmits the results of such monitoring and/or measurements to another wireless device and/or a network node. The wireless device may in this case be a machine-to-machine (M2M) device, which may in a 3GPP context be referred to as an MTC device. As one particular example, the wireless device may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a wireless device may represent a vehicle or other equipment that is capable of monitoring and/or reporting on its operational status or other functions associated with its operation. A wireless device as described above may represent the endpoint of a wireless connection, in which case the device may be referred to as a wireless terminal. Furthermore, a wireless device as described above may be mobile, in which case it may also be referred to as a mobile device or a mobile terminal.

As illustrated, wireless device 810 includes antenna 811, interface 814, processing circuitry 820, device readable medium 830, user interface equipment 832, auxiliary equipment 834, power source 836 and power circuitry 837. wireless device 810 may include multiple sets of one or more of the illustrated components for different wireless technologies supported by wireless device 88, such as, for example, GSM, WCDMA, LTE, NR, Wi-Fi, WiMAX, NB-IoT, or Bluetooth wireless technologies, just to mention a few. These wireless technologies may be integrated into the same or different chips or set of chips as other components within wireless device 810.

Antenna 811 may include one or more antennas or antenna arrays, configured to send and/or receive wireless signals, and is connected to interface 814. In certain alternative embodiments, antenna 811 may be separate from wireless device 810 and be connectable to wireless device 810 through an interface or port. Antenna 811, interface 814, and/or processing circuitry 820 may be configured to perform any receiving or transmitting operations described herein as being performed by a wireless device. Any information, data and/or signals may be received from a network node and/or another wireless device. In some embodiments, radio front end circuitry and/or antenna 811 may be considered an interface.

As illustrated, interface 814 comprises radio front end circuitry 812 and antenna 811. Radio front end circuitry 812 comprise one or more filters 818 and amplifiers 816. Radio front end circuitry 812 is connected to antenna 811 and processing circuitry 820, and is configured to condition signals communicated between antenna 811 and processing circuitry 820. Radio front end circuitry 812 may be coupled to or a part of antenna 811. In some embodiments, wireless device 810 may not include separate radio front end circuitry 812; rather, processing circuitry 820 may comprise radio front end circuitry and may be connected to antenna 811. Similarly, in some embodiments, some or all of RF transceiver circuitry 822 may be considered a part of interface 814. Radio front end circuitry 812 may receive digital data that is to be sent out to other network nodes or wireless devices via a wireless connection. Radio front end circuitry 812 may convert the digital data into a radio signal having the appropriate channel and bandwidth parameters using a combination of filters 818 and/or amplifiers 816. The radio signal may then be transmitted via antenna 811. Similarly, when receiving data, antenna 811 may collect radio signals which are then converted into digital data by radio front end circuitry 812. The digital data may be passed to processing circuitry 820. In other embodiments, the interface may comprise different components and/or different combinations of components.

Processing circuitry 820 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other wireless device 810 components, such as device readable medium 830, wireless device 810 functionality. Such functionality may include providing any of the various wireless features or benefits discussed herein. For example, processing circuitry 820 may execute instructions stored in device readable medium 830 or in memory within processing circuitry 820 to provide the functionality disclosed herein.

As illustrated, processing circuitry 820 includes one or more of RF transceiver circuitry 822, baseband processing circuitry 824, and application processing circuitry 826. In other embodiments, the processing circuitry may comprise different components and/or different combinations of components. In certain embodiments processing circuitry 820 of wireless device 810 may comprise a SOC. In some embodiments, RF transceiver circuitry 822, baseband processing circuitry 824, and application processing circuitry 826 may be on separate chips or sets of chips. In alternative embodiments, part or all of baseband processing circuitry 824 and application processing circuitry 826 may be combined into one chip or set of chips, and RF transceiver circuitry 822 may be on a separate chip or set of chips. In still alternative embodiments, part or all of RF transceiver circuitry 822 and baseband processing circuitry 824 may be on the same chip or set of chips, and application processing circuitry 826 may be on a separate chip or set of chips. In yet other alternative embodiments, part or all of RF transceiver circuitry 822, baseband processing circuitry 824, and application processing circuitry 826 may be combined in the same chip or set of chips. In some embodiments, RF transceiver circuitry 822 may be a part of interface 814. RF transceiver circuitry 822 may condition RF signals for processing circuitry 820.

In certain embodiments, some or all of the functionality described herein as being performed by a wireless device may be provided by processing circuitry 820 executing instructions stored on device readable medium 830, which in certain embodiments may be a computer-readable storage medium. In alternative embodiments, some or all of the functionality may be provided by processing circuitry 820 without executing instructions stored on a separate or discrete device readable storage medium, such as in a hard-wired manner. In any of those particular embodiments, whether executing instructions stored on a device readable storage medium or not, processing circuitry 820 may be configured to perform the described functionality. The benefits provided by such functionality are not limited to processing circuitry 820 alone or to other components of wireless device 88, but are enjoyed by wireless device 810 as a whole, and/or by end users and the wireless network generally.

Processing circuitry 820 may be configured to perform any determining, calculating, or similar operations (e.g., certain obtaining operations) described herein as being performed by a wireless device. These operations, as performed by processing circuitry 820, may include processing information obtained by processing circuitry 820 by, for example, converting the obtained information into other information, comparing the obtained information or converted information to information stored by wireless device 88, and/or performing one or more operations based on the obtained information or converted information, and as a result of said processing making a determination.

Device readable medium 830 may be operable to store a computer program, software, an application including one or more of logic, rules, code, tables, etc. and/or other instructions capable of being executed by processing circuitry 820. Device readable medium 830 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 820. In some embodiments, processing circuitry 820 and device readable medium 830 may be considered to be integrated.

User interface equipment 832 may provide components that allow for a human user to interact with wireless device 810. Such interaction may be of many forms, such as visual, audial, tactile, etc. User interface equipment 832 may be operable to produce output to the user and to allow the user to provide input to wireless device 810. The type of interaction may vary depending on the type of user interface equipment 832 installed in wireless device 810. For example, if wireless device 810 is a smart phone, the interaction may be via a touch screen; if wireless device 810 is a smart meter, the interaction may be through a screen that provides usage (e.g., the number of gallons used) or a speaker that provides an audible alert (e.g., if smoke is detected). User interface equipment 832 may include input interfaces, devices and circuits, and output interfaces, devices and circuits. User interface equipment 832 is configured to allow input of information into wireless device 810, and is connected to processing circuitry 820 to allow processing circuitry 820 to process the input information. User interface equipment 832 may include, for example, a microphone, a proximity or other sensor, keys/buttons, a touch display, one or more cameras, a USB port, or other input circuitry. User interface equipment 832 is also configured to allow output of information from wireless device 810, and to allow processing circuitry 820 to output information from wireless device 810. User interface equipment 832 may include, for example, a speaker, a display, vibrating circuitry, a USB port, a headphone interface, or other output circuitry. Using one or more input and output interfaces, devices, and circuits, of user interface equipment 832, wireless device 810 may communicate with end users and/or the wireless network, and allow them to benefit from the functionality described herein.

Auxiliary equipment 834 is operable to provide more specific functionality which may not be generally performed by wireless devices. This may comprise specialized sensors for doing measurements for various purposes, interfaces for additional types of communication such as wired communications etc. The inclusion and type of components of auxiliary equipment 834 may vary depending on the embodiment and/or scenario.

Power source 836 may, in some embodiments, be in the form of a battery or battery pack. Other types of power sources, such as an external power source (e.g., an electricity outlet), photovoltaic devices or power cells, may also be used. The wireless device 810 may further comprise power circuitry 837 for delivering power from power source 836 to the various parts of wireless device 810 which need power from power source 836 to carry out any functionality described or indicated herein. Power circuitry 837 may in certain embodiments comprise power management circuitry. Power circuitry 837 may additionally or alternatively be operable to receive power from an external power source; in which case wireless device 810 may be connectable to the external power source (such as an electricity outlet) via input circuitry or an interface such as an electrical power cable. Power circuitry 837 may also in certain embodiments be operable to deliver power from an external power source to power source 836. This may be, for example, for the charging of power source 836. Power circuitry 837 may perform any formatting, converting, or other modification to the power from power source 836 to make the power suitable for the respective components of wireless device 810 to which power is supplied.

Figure 9:
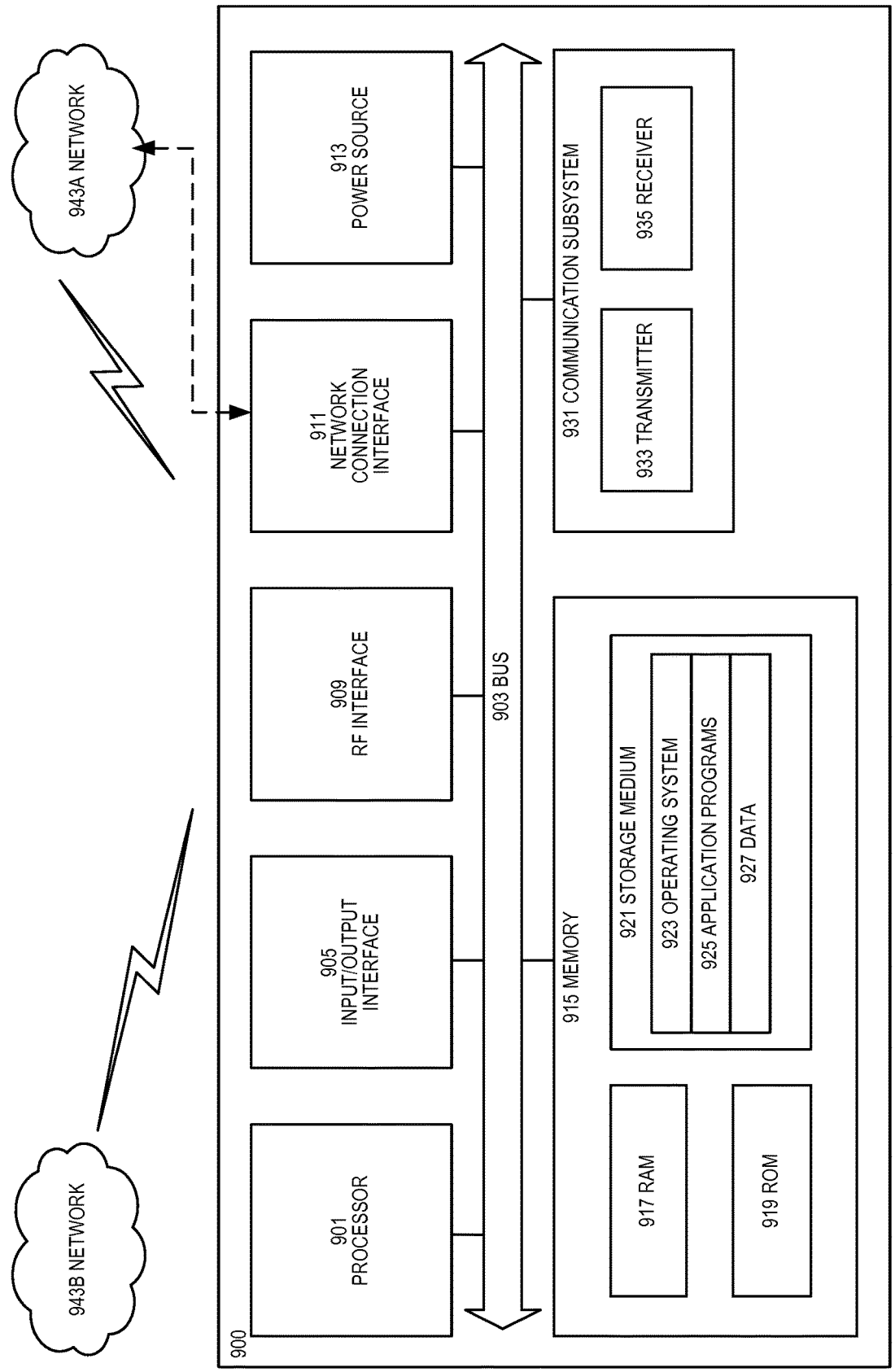
FIG. 9 illustrates one embodiment of a UE in accordance with various aspects as described herein.

FIG. 9 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 900 may be any UE identified by the 3rd Generation Partnership Project (3GPP), including a NB-IoT UE, a machine type communication (MTC) UE, and/or an enhanced MTC (eMTC) UE. UE 900, as illustrated in FIG. 9, is one example of a wireless device configured for communication in accordance with one or more communication standards promulgated by the $3^{rd}$ Generation Partnership Project (3GPP), such as 3GPP's GSM, UMTS, LTE, and/or 5G standards. As mentioned previously, the term wireless device and UE may be used interchangeable. Accordingly, although FIG. 9 is a UE, the components discussed herein are equally applicable to a wireless device, and vice-versa.

In FIG. 9, UE 900 includes processing circuitry 901 that is operatively coupled to input/output interface 905, radio frequency (RF) interface 909, network connection interface 911, memory 915 including random access memory (RAM) 917, read-only memory (ROM) 919, and storage medium 921 or the like, communication subsystem 931, power source 933, and/or any other component, or any combination thereof. Storage medium 921 includes operating system 923, application program 925, and data 927. In other embodiments, storage medium 921 may include other similar types of information. Certain UEs may utilize all of the components shown in FIG. 9, or only a subset of the components. The level of integration between the components may vary from one UE to another UE. Further, certain UEs may contain multiple instances of a component, such as multiple processors, memories, transceivers, transmitters, receivers, etc.

In FIG. 9, processing circuitry 901 may be configured to process computer instructions and data. Processing circuitry 901 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 901 may include two central processing units (CPUs). Data may be information in a form suitable for use by a computer.

In the depicted embodiment, input/output interface 905 may be configured to provide a communication interface to an input device, output device, or input and output device. UE 900 may be configured to use an output device via input/output interface 905. An output device may use the same type of interface port as an input device. For example, a USB port may be used to provide input to and output from UE 900. The output device may be a speaker, a sound card, a video card, a display, a monitor, a printer, an actuator, an emitter, a smartcard, another output device, or any combination thereof. UE 900 may be configured to use an input device via input/output interface 905 to allow a user to capture information into UE 900. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 9, RF interface 909 may be configured to provide a communication interface to RF components such as a transmitter, a receiver, and an antenna. Network connection interface 911 may be configured to provide a communication interface to network 943a. Network 943a may encompass wired and/or wireless networks such as a local-area network (LAN), a wide-area network (WAN), a computer network, a wireless network, a telecommunications network, another like network or any combination thereof. For example, network 943a may comprise a Wi-Fi network. Network connection interface 911 may be configured to include a receiver and a transmitter interface used to communicate with one or more other devices over a communication network according to one or more communication protocols, such as Ethernet, TCP/IP, SONET, ATM, or the like. Network connection interface 911 may implement receiver and transmitter functionality appropriate to the communication network links (e.g., optical, electrical, and the like). The transmitter and receiver functions may share circuit components, software or firmware, or alternatively may be implemented separately.

RAM 917 may be configured to interface via bus 902 to processing circuitry 901 to provide storage or caching of data or computer instructions during the execution of software programs such as the operating system, application programs, and device drivers. ROM 919 may be configured to provide computer instructions or data to processing circuitry 901. For example, ROM 919 may be configured to store invariant low-level system code or data for basic system functions such as basic input and output (I/O), startup, or reception of keystrokes from a keyboard that are stored in a non-volatile memory. Storage medium 921 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 921 may be configured to include operating system 923, application program 925 such as a web browser application, a widget or gadget engine or another application, and data file 927. Storage medium 921 may store, for use by UE 900, any of a variety of various operating systems or combinations of operating systems.

Storage medium 921 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 921 may allow UE 900 to access computer-executable instructions, application programs or the like, stored on transitory or non-transitory memory media, to off-load data, or to upload data. An article of manufacture, such as one utilizing a communication system may be tangibly embodied in storage medium 921, which may comprise a device readable medium.

In FIG. 9, processing circuitry 901 may be configured to communicate with network 943b using communication subsystem 931. Network 943a and network 943b may be the same network or networks or different network or networks. Communication subsystem 931 may be configured to include one or more transceivers used to communicate with network 943b. For example, communication subsystem 931 may be configured to include one or more transceivers used to communicate with one or more remote transceivers of another device capable of wireless communication such as another wireless device, UE, or base station of a radio access network (RAN) according to one or more communication protocols, such as IEEE 802.11, CDMA, WCDMA, GSM, LTE, UTRAN, WiMax, or the like. Each transceiver may include transmitter 933 and/or receiver 935 to implement transmitter or receiver functionality, respectively, appropriate to the RAN links (e.g., frequency allocations and the like). Further, transmitter 933 and receiver 935 of each transceiver may share circuit components, software or firmware, or alternatively may be implemented separately.

In the illustrated embodiment, the communication functions of communication subsystem 931 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 931 may include cellular communication, Wi-Fi communication, Bluetooth communication, and GPS communication. Network 943b may encompass wired and/or wireless networks such as a local-area network (LAN), a wide-area network (WAN), a computer network, a wireless network, a telecommunications network, another like network or any combination thereof. For example, network 943b may be a cellular network, a Wi-Fi network, and/or a near-field network. Power source 913 may be configured to provide alternating current (AC) or direct current (DC) power to components of UE 900.

The features, benefits and/or functions described herein may be implemented in one of the components of UE 900 or partitioned across multiple components of UE 900. Further, the features, benefits, and/or functions described herein may be implemented in any combination of hardware, software or firmware. In one example, communication subsystem 931 may be configured to include any of the components described herein. Further, processing circuitry 901 may be configured to communicate with any of such components over bus 902. In another example, any of such components may be represented by program instructions stored in memory that when executed by processing circuitry 901 perform the corresponding functions described herein. In another example, the functionality of any of such components may be partitioned between processing circuitry 901 and communication subsystem 931. In another example, the non-computationally intensive functions of any of such components may be implemented in software or firmware and the computationally intensive functions may be implemented in hardware.

Those skilled in the art will also appreciate that embodiments herein further include corresponding computer programs.

A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts and/or wireless network types for illustrative purposes, but the embodiments are similarly applicable in other contexts and/or wireless network types not explicitly described.

Devices part of a distributed execution environment defines a required sleep period. A required sleep period is the required time a device needs to sleep to guarantee operation on a battery for a certain time. This period is known to the execution environment and used when applications are deployed and re-deployed to new devices to avoid breaking the requirement on device sleep. And by using a programming model where the triggers (e.g., events that trigger the execution of a function such as a timer) that control the execution of an application may be extracted. The triggers are matched towards the required sleep period of the available devices and a matching device may be found that may host the application or a function part of an application.

For applications that do not include any explicit triggers, the execution environment records and builds up knowledge about execution pattern(s) of an application and uses that information to dynamically set and adapt the sleep pattern of devices hosting the application.

At application deployment or re-deployment, a device may perform one or more of the following:
1. Functions part of the application with explicit triggers, such functions using a timer to trigger the execution, are matched towards the available devices to find a device that may host the function based on the required sleep period. The device receiving the function uses the trigger to set the sleep pattern. If multiple triggers exist on the device, the triggers are correlated and the closest in time to trigger is used as the current sleep period.
2. For functions part of the application with an explicit trigger residing on a different device part of the execution environment, the information about the triggers controlling the function being deployed may be included in the deployment information. If the information is not available, then the runtime receiving the function may query the execution environment to get information.
3. For applications without any explicit triggers and without any historical data of the execution, the device uses the existing sleep pattern and the execution environment adapts and tunes the sleep pattern over time based on the execution of the application. If the execution rate breaks the sleep requirement, then the application or function part of an application is moved to another runtime that is capable of serving it.
4. For functions with existing historical data, the device uses that to set the sleep pattern and adapts and tunes the sleep pattern over time. If the device is not capable of analyzing the historical data, it delegates the task to a runtime part of the execution environment with such capabilities.

At device sleep, a device may perform one or more of the following:
1. The state of all applications or parts of an application is written to memory, which is not affected by the device issuing a reset.
   a. If the device has a non-volatile memory, then the state is written to the non-volatile memory.
   b. If the device does not have a non-volatile memory, the state is sent to another device of the distributed environment that doesn't implement a sleep mode, with the other device being operable to response to requests for the state when the device is awaken.
2. The device indicates that it is about to enter a sleep mode.
3. A real-time clock (RTC) is configured to reset the central processing unit (CPU) of the device according to the current sleep pattern.
4. The device enters a sleep mode.
5. All communication to the device is queued by the endpoint devices in the distributed network until the device is awake.

At device wake up, a device may perform one or more of the following:
1. The device restores its state from the state stored before entering sleep mode.
2. The device announces its presence, endpoints with pending data to the device are now flushed.
3. The device executes any pending functions.
4. If no activity, return to sleep mode.

Figure 10A:
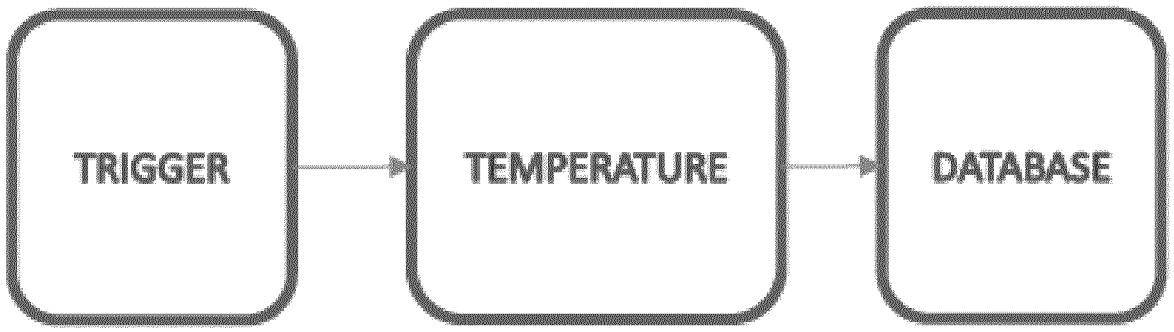
FIGS. 10A-D show different applications of performing a temperature measurement in accordance with various aspects as described herein.

FIG. 10A illustrates an application used to perform a temperature measurement and to write the measured temperature values to a database. The application is built of three functional blocks:
1. Trigger, produces a trigger signal sent to the Temperature function.
2. Temperature, triggered by the signal from the Trigger function. Performs a temperature measurement and sends the measured value to the Database function.
3. Database, triggered by the value sent by Temperature and writes the value to a database.

These blocks build a graph of the data flow that may be deployed on individual runtimes part of the distributed execution environment and enables analysis to find the blocks that control the execution.

Figure 10B:
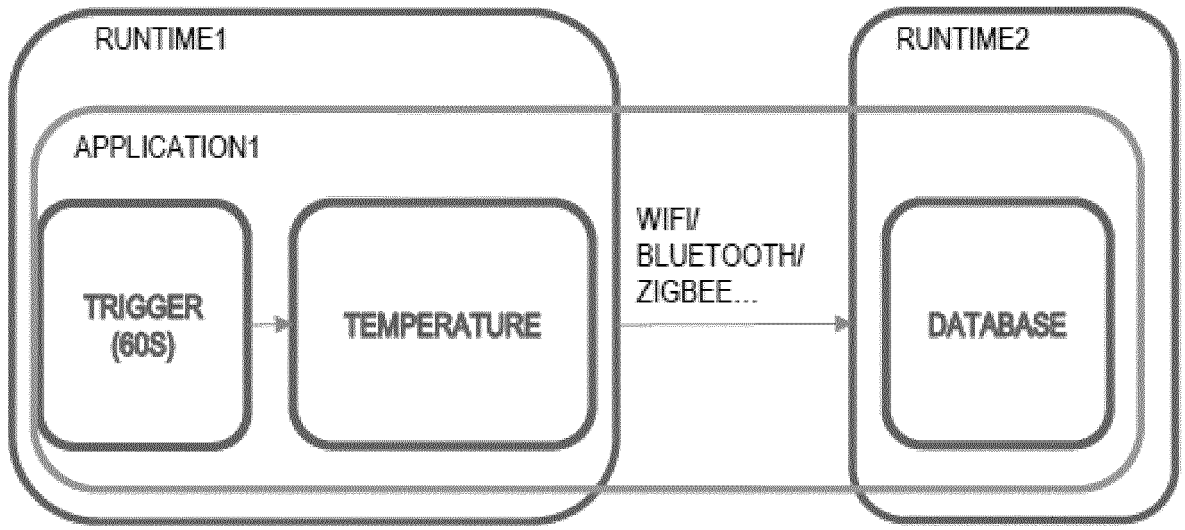

FIG. 10B illustrates the application deployed on two separate runtimes. The Trigger function uses a timer with a timeout of sixty seconds and triggers the Temperature function. When deployed, Runtime1 analyzes the graph and may find out that the only trigger used is sixty seconds and that this sixty seconds is then used as the current sleep pattern.

Figure 10C:
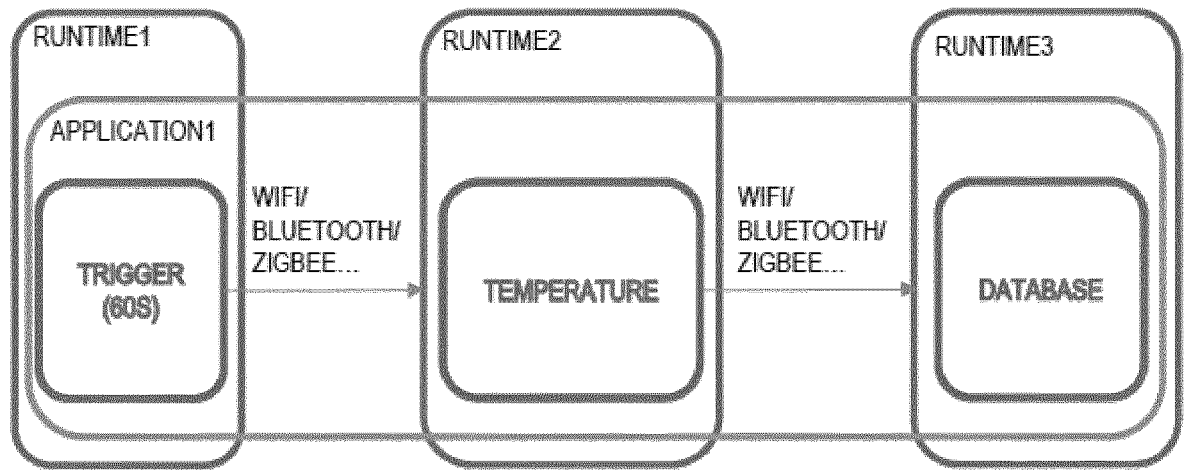

FIG. 10C illustrates the application distributed on three separate runtimes. When the Temperate function is deployed on Runtime2, Runtime2 queries the execution environment to determine the trigger. The execution environment analyses the graph and finds the Trigger function and returns sixty seconds and Runtime2 then uses this sixty seconds as the sleep pattern.

Figure 10D:
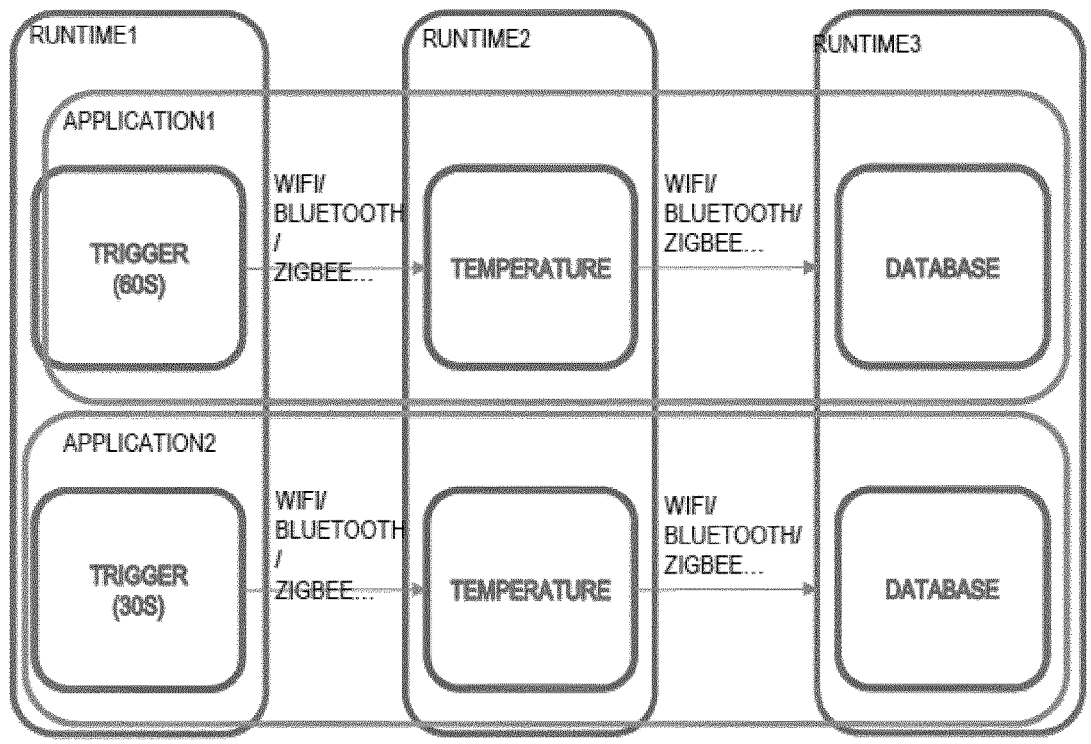

FIG. 10D illustrates a second application deployed with a first application. When the second application is deployed, Runtime2 queries the execution environment for the trigger of the Temperature function of the second application, as in the previous step. When received, Runtime2 correlates the trigger of the second application with the trigger of the first application, with the thirty second trigger of the second application being used as the new sleep pattern to serve both applications.

Figure 11:
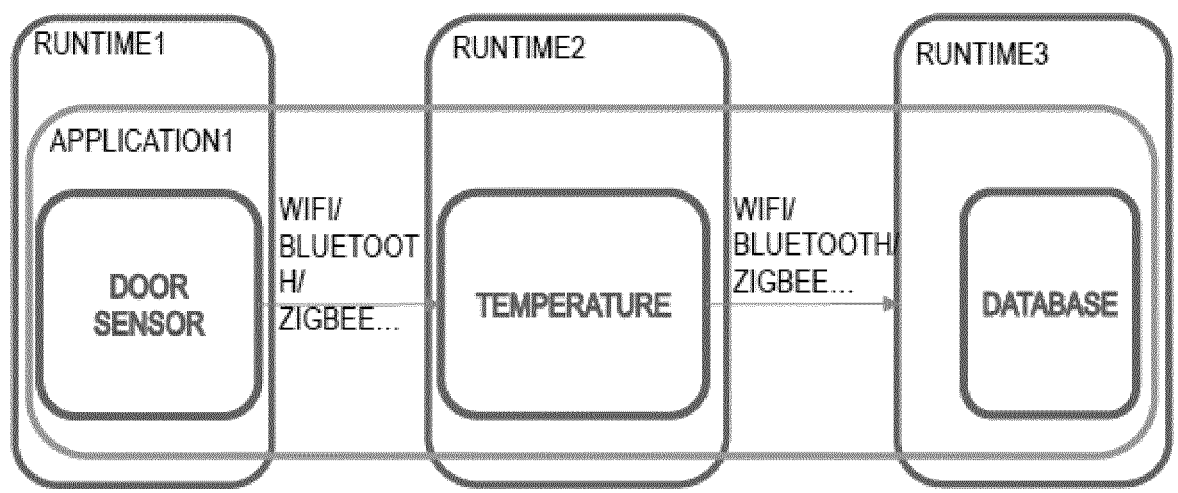
FIG. 11 shows an application having a door sensor as a trigger in accordance with various aspects as described herein.

FIG. 11 illustrates an application where the trigger is a door sensor. A signal is sent to trigger a temperature measurement when the door is opened or closed. In this case, no explicit triggers exists, Runtime2 will initially use its default sleep pattern and the sleep pattern will be adapted and tuned overtime as Runtime 2 and the execution environment gain knowledge of the execution pattern of the program. The execution pattern may be analyzed by recording when and how often actions are executed and also by analyzing the transmission queues to see if data is being queued up in any part of the graph. If the resulting sleep pattern breaks the sleep requirement of Runtime2, the Temperature function may be moved to another runtime that is capable of handling the execution.

The various aspects described herein may be implemented using standard programming or engineering techniques to produce software, firmware, hardware (e.g., circuits), or any combination thereof to control a computing device to implement the disclosed subject matter. It will be appreciated that some embodiments may be comprised of one or more generic or specialized processors such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the methods, devices and systems described herein. Alternatively, some or all functions could be implemented by a state machine that has no stored program instructions, or in one or more application specific integrated circuits (ASICs), in which each function or some combinations of certain of the functions are implemented as custom logic circuits. Of course, a combination of the two approaches may be used. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The term "article of manufacture" as used herein is intended to encompass a computer program accessible from any computing device, carrier, or media. For example, a computer-readable medium may include: a magnetic storage device such as a hard disk, a floppy disk or a magnetic strip; an optical disk such as a compact disk (CD) or digital versatile disk (DVD); a smart card; and a flash memory device such as a card, stick or key drive. Additionally, it should be appreciated that a carrier wave may be employed to carry computer-readable electronic data including those used in transmitting and receiving electronic data such as electronic mail (e-mail) or in accessing a computer network such as the Internet or a local area network (LAN). Of course, a person of ordinary skill in the art will recognize many modifications may be made to this configuration without departing from the scope or spirit of the subject matter of this disclosure.

Throughout the specification and the embodiments, the following terms take at least the meanings explicitly associated herein, unless the context clearly dictates otherwise. Relational terms such as "first" and "second," and the like may be used solely to distinguish one entity or action from another entity or action without necessarily requiring or implying any actual such relationship or order between such entities or actions. The term "or" is intended to mean an inclusive "or" unless specified otherwise or clear from the context to be directed to an exclusive form. Further, the terms "a," "an," and "the" are intended to mean one or more unless specified otherwise or clear from the context to be directed to a singular form. The term "include" and its various forms are intended to mean including but not limited to. References to "one embodiment," "an embodiment," "example embodiment," "various embodiments," and other like terms indicate that the embodiments of the disclosed technology so described may include a particular function, feature, structure, or characteristic, but not every embodiment necessarily includes the particular function, feature, structure, or characteristic. Further, repeated use of the phrase "in one embodiment" does not necessarily refer to the same embodiment, although it may. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. A device or structure that is "configured" in a certain way is configured in at least that way, but may also be configured in ways that are not listed.

The invention claimed is:

1. A method performed by a node that is associated with a distributed system comprising a set of distributed nodes arranged to execute a plurality of functions of a program, the method comprising:

obtaining an execution pattern of the program and respective sleep requirements of at least one distributed node;

determining respective sleep patterns of the at least one distributed node based on the respective sleep requirements;

dynamically deploying one or more functions of the program to all or a portion of the set for execution of the program by the set based on the execution pattern of the program and the respective sleep requirements of the at least one distributed node, wherein the execution pattern is associated with events that trigger execution of at least one of the one or more functions, with each distributed node being operable to have the trigger events programmed for that at least one function during deployment or execution of the program; and adapting the determined sleep pattern of at least one distributed node based on the execution pattern associated with the events that trigger execution of the at least one of the one or more functions.

2. The method of claim 1, wherein obtaining the execution pattern includes receiving, from at least one distributed node, an indication of the execution pattern.

3. The method of claim 1, wherein obtaining the execution pattern includes determining the execution pattern based on:

the events that trigger execution of the at least one of the one or more functions, or the sleep requirement of the at least one distributed node.

4. The method of claim 1, wherein obtaining the execution pattern includes receiving, from the at least one distributed node, respective indications of the respective sleep requirements of the at least one distributed node.

5. The method of claim 1, wherein dynamically deploying one or more functions of the program includes matching the one or more functions of the program to respective distributed nodes of the set based on the execution pattern of the program and the respective sleep requirements of the at least one distributed node.

6. The method of claim 1, wherein said dynamically deploying includes matching the at least one of the one or more functions that is triggered by the events to one distributed node of the set based on the execution pattern of the program and the respective sleep requirements of the at least one distributed node.

7. The method of claim 1, wherein:
obtaining the execution pattern includes obtaining a pattern of the events that trigger execution of the at least one of the one or more functions; and
the execution pattern of the program is the trigger event pattern.

8. The method of claim 7, wherein obtaining the pattern of the trigger events includes one or more of the following:
receiving an indication of the trigger event pattern from the distributed node that hosts the at least one of the one or more functions that is triggered by the events; and
determining the trigger event pattern based on the events that trigger execution of the at least one of the one or more functions.

9. The method of claim 1, further comprising:
obtaining an execution pattern of a second program; and
dynamically deploying one or more functions of the second program to all or a portion of the set for execution of the second program contemporaneous with the execution of the program by the set based on the execution patterns of the program and the second program and the respective sleep requirements of the at least one distributed node.

10. The method of claim 1, wherein the events that trigger execution of the at least one of the one or more functions are associated with one or more of the following of the distributed node of the set that hosts the at least one of the one or more functions that is triggered by the events:
a hardware or software timer;
a sleep requirement; and
a sensor.

11. The method of claim 1, wherein one of the following applies:
the node represents at least one distributed node of the set; or
the node is a computer-implemented node that is a communication redistribution point or a communication endpoint in a network.

12. The method of claim 1, wherein one or more of the following applies:
the node is represented by a virtual server; and
the least one distributed node of the set is represented by a virtual server.

13. The method of claim 1, wherein at least one distributed node of the set is represented by a computer-implemented node that is a communication redistribution point or a communication endpoint in a network.

14. The method of claim 1, wherein two or more distributed nodes of the set are each represented by different processors of one node.

15. A node that is associated with a distributed system comprising a set of distributed nodes arranged to execute a plurality of functions of a program, the node comprising at least one processor configured to execute instructions that cause the node to:
obtain an execution pattern of the program and respective sleep requirements of at least one distributed node;
determine respective sleep patterns of the at least one distributed node based on the respective sleep requirements;
dynamically deploy one or more functions of the program to all or a portion of the set for execution of the program by the set based on the execution pattern of the program and the respective sleep requirements of the at least one distributed node, wherein the execution pattern is associated with events that trigger execution of at least one of the one or more functions, with each node being operable to have the trigger events programmed for that at least one function during deployment or execution of the program; and
adapt the determined sleep pattern of at least one distributed node based on the execution pattern associated with the events that trigger execution of the at least one of the one or more functions.

16. The node of claim 15, wherein execution of the instructions causes the node to obtain the execution pattern based on one of the following:
receiving, from at least one distributed node, an indication of the execution pattern;
determining the execution pattern based on:
the events that trigger execution of the at least one of the one or more functions, or
the respective sleep requirements of the at least one distributed node; or
receiving, from the at least one distributed node, respective indications of the respective sleep requirements of the at least one distributed node.

17. The node of claim 15, wherein execution of the instructions causes the node to dynamically deploy one or more functions of the program based on one or more of the following:
matching the one or more functions of the program to respective distributed nodes of the set based on the execution pattern of the program and the respective sleep requirements of the at least one distributed node; and
matching the at least one of the one or more functions that is triggered by the events to one distributed node of the set based on the execution pattern of the program and the respective sleep requirements of the at least one distributed node.

18. The node of claim 15, further comprising communication circuitry and a sensor associated with the events that trigger execution of the at least one of the one or more functions.

19. The node of claim 15, wherein execution of the instructions further causes the node to:
obtain an execution pattern of a second program; and
dynamically deploy one or more functions of the second program to all or a portion of the set for execution of the second program contemporaneous with the execution of the program by the set based on the execution patterns of the program and the second program and the respective sleep requirements of the at least one distributed node.

20. A non-transitory, computer-readable medium storing computer-executable instructions, wherein execution of the instructions by at least one processor of a node associated with a distributed system comprising a set of distributed nodes arranged for executing a plurality of functions of a program, causes the node to:
obtain an execution pattern of the program and respective sleep requirements of at least one distributed node;

determine respective sleep patterns of the at least one distributed node based on the respective sleep requirements;

dynamically deploy one or more functions of the program to all or a portion of the set for execution of the program by the set based on the execution pattern of the program and the respective sleep requirements of the at least one distributed node, wherein the execution pattern is associated with events that trigger execution of at least one of the one or more functions, with each distributed node being operable to have the trigger events programmed for that at least one function during deployment or execution of the program; and adapt the determined sleep pattern of at least one distributed node based on the execution pattern associated with the events that trigger execution of the at least one of the one or more functions.

\* \* \* \* \*